United States Patent
Liu et al.

(10) Patent No.: US 10,136,452 B2
(45) Date of Patent: Nov. 20, 2018

(54) ENHANCED PRACH FOR STANDALONE CONTENTION BASED COMMUNICATIONS INCLUDING UNLICENSED SPECTRUM

(71) Applicant: QUALCOMM Incorporated, San Diego, CA (US)

(72) Inventors: Zhengwei Liu, San Diego, CA (US); Xiaoxia Zhang, San Diego, CA (US); Wanshi Chen, San Diego, CA (US); Siddhartha Mallik, San Diego, CA (US); Aleksandar Damnjanovic, Del Mar, CA (US); Onkar Jayant Dabeer, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 193 days.

(21) Appl. No.: 15/050,404

(22) Filed: Feb. 22, 2016

(65) Prior Publication Data
US 2016/0323915 A1    Nov. 3, 2016

Related U.S. Application Data

(60) Provisional application No. 62/120,205, filed on Feb. 24, 2015.

(51) Int. Cl.
*H04W 16/14* (2009.01)
*H04W 74/08* (2009.01)
*H04W 84/04* (2009.01)

(52) U.S. Cl.
CPC ....... *H04W 74/0825* (2013.01); *H04W 16/14* (2013.01); *H04W 74/0833* (2013.01); *H04W 74/0808* (2013.01); *H04W 84/042* (2013.01)

(58) Field of Classification Search
CPC . H04W 16/14; H04W 74/08; H04W 74/0808; H04W 74/0825; H04W 74/0833; H04W 84/042; H04W 72/0446
See application file for complete search history.

(56) References Cited

U.S. PATENT DOCUMENTS 9,510,208 B2 * 11/2016 Wei ............... H04W 16/14
9,591,644 B2 *  3/2017 Chen .............. H04W 48/12
(Continued)

FOREIGN PATENT DOCUMENTS

WO    WO-2013126858 A1    8/2013
WO    WO-2015023909 A2    2/2015
(Continued)

OTHER PUBLICATIONS

Catt, Listen Before Talk for LAA, 3GPP TSG RAN WG1 Meeting # 79, R1-144625, Nov. 21, 2014, 3GPP, http://www.3gpp.org/ftp/tsg_ran/WG1_RL1/TSGR1_79/Docs/R1-144625.zip (accessed Oct. 27, 2017).*
(Continued)

*Primary Examiner* — Eric Nowlin
(74) *Attorney, Agent, or Firm* — Norton Rose Fulbright LLP

(57) ABSTRACT

Additional improvements to the design of enhanced physical random access channel (ePRACH) procedures are disclosed for communications systems having contention-based shared spectrum including unlicensed frequency bands. The additional improvements address the uncertainty of transmission in listen before talk (LBT)-based communications and cooperation with other radio access technologies competing for the same frequency spectrum.

24 Claims, 17 Drawing Sheets

(56) References Cited

U.S. PATENT DOCUMENTS

| | | | |
|---|---|---|---|
| 9,615,279 B2 * | 4/2017 | Davydov | H04W 74/0816 |
| 9,717,071 B2 * | 7/2017 | Chen | H04W 72/04 |
| 9,743,432 B2 * | 8/2017 | Ji | H04W 74/0866 |
| 9,763,225 B2 * | 9/2017 | Ji | H04W 72/04 |
| 9,801,115 B2 * | 10/2017 | Sadek | H04W 40/16 |
| 9,942,919 B2 * | 4/2018 | Mukherjee | H04W 16/14 |
| 2014/0378157 A1 * | 12/2014 | Wei | H04W 16/14 455/454 |
| 2015/0049712 A1 * | 2/2015 | Chen | H04W 72/1215 370/329 |
| 2015/0049741 A1 * | 2/2015 | Chen | H04W 48/12 370/336 |
| 2015/0063099 A1 * | 3/2015 | Sadek | H04W 74/0816 370/229 |
| 2015/0085797 A1 * | 3/2015 | Ji | H04J 3/16 370/329 |
| 2015/0098349 A1 * | 4/2015 | Wei | H04W 16/14 370/252 |
| 2015/0099525 A1 * | 4/2015 | Ji | H04W 72/04 455/450 |
| 2016/0050667 A1 * | 2/2016 | Papasakellariou | H04W 74/0808 370/329 |
| 2016/0080974 A1 * | 3/2016 | Barriac | H04L 43/0882 370/236 |
| 2016/0095018 A1 * | 3/2016 | Vajapeyam | H04W 36/0005 370/331 |
| 2016/0095125 A1 * | 3/2016 | Park | H04W 8/02 370/329 |
| 2016/0105907 A1 * | 4/2016 | Lee | H04W 16/14 370/336 |
| 2016/0143014 A1 * | 5/2016 | Mukherjee | H04W 74/0816 370/330 |
| 2016/0205562 A1 * | 7/2016 | Wei | H04W 16/14 455/454 |
| 2016/0212625 A1 * | 7/2016 | Damnjanovic | H04W 74/0875 |
| 2016/0219448 A1 * | 7/2016 | Davydov | H04W 74/0816 |
| 2016/0234861 A1 * | 8/2016 | Ye | H04W 74/0808 |
| 2016/0262188 A1 * | 9/2016 | Zhang | H04J 11/0056 |
| 2016/0278050 A1 * | 9/2016 | Nory | H04W 16/14 |
| 2016/0302076 A1 * | 10/2016 | Chou | H04W 16/14 |
| 2016/0309334 A1 * | 10/2016 | Bhorkar | H04W 16/14 |
| 2016/0316374 A1 * | 10/2016 | Xu | H04W 16/14 |
| 2016/0323915 A1 * | 11/2016 | Liu | H04W 16/14 |
| 2017/0127404 A1 * | 5/2017 | Merlin | H04W 72/0413 |
| 2017/0150523 A1 * | 5/2017 | Patel | H04B 7/26 |
| 2017/0181003 A1 * | 6/2017 | Chen | H04W 16/14 |
| 2017/0230986 A1 * | 8/2017 | Moon | H04W 74/08 |
| 2017/0245302 A1 * | 8/2017 | Mukherjee | H04W 74/0808 |
| 2017/0257879 A1 * | 9/2017 | Kang | H04W 74/002 |
| 2017/0265095 A1 * | 9/2017 | Harada | H04W 16/14 |
| 2017/0273108 A1 * | 9/2017 | Damnjanovic | H04L 27/2602 |
| 2017/0280479 A1 * | 9/2017 | Frenne | H04W 74/0808 |
| 2017/0290059 A1 * | 10/2017 | Karaki | H04W 74/0816 |
| 2017/0303220 A1 * | 10/2017 | Sadeghi | H04W 56/001 |
| 2018/0035465 A1 * | 2/2018 | Ahn | H04W 74/0833 |
| 2018/0092128 A1 * | 3/2018 | Um | H04W 74/0808 |
| 2018/0110056 A1 * | 4/2018 | Zhang | H04L 5/0048 |
| 2018/0110071 A1 * | 4/2018 | Mukherjee | H04W 16/14 |
| 2018/0146476 A1 * | 5/2018 | Kim | H04W 72/0446 |
| 2018/0146498 A1 * | 5/2018 | Sahlin | H04W 74/0841 |

FOREIGN PATENT DOCUMENTS

| | | | | |
|---|---|---|---|---|
| WO | WO 2016028060 A1 * | 2/2016 | | H04W 74/0808 |
| WO | WO 2016182385 A1 * | 11/2016 | | H04W 56/00 |
| WO | WO 2017025000 A1 * | 2/2017 | | H04L 27/26 |
| WO | WO 2017136458 A2 * | 8/2017 | | H04W 74/0833 |

OTHER PUBLICATIONS

Kyocera, Further Considerations on the Essential Functionalities for LAA, 3GPP TSG RAN WG1 Meeting # 79, R1-144625, Nov. 21, 2014, 3GPP, http://www.3gpp.org/ftp/tsg_ran/WG1_RL1/TSGR1_79/Docs/R1-144955.zip (accessed Oct. 27, 2017).*

Nokia Corporation et al., LAA LBT Operation Using Reservation Signals, 3GPP TSG RAN WG1 Meeting #79, R1-145004, Nov. 21, 2014, 3GPP, http://www.3gpp.org/ftp/tsg_ran/WG1_RL1/TSGR1_79/Docs/R1-145004.zip (accessed Oct. 27, 2017).*

Intel Corporation, LBT Design for LAA Downlink, 3GPP TSG RAN WG1 Meeting # 80, R1-150089, Feb. 13, 2015, 3GPP, http://www.3gpp.org/ftp/tsg_ran/WG1_RL1/TSGR1_80/Docs/R1-150089.zip (accessed Oct. 27, 2017).*

Catt, Design of Frame-Based LBT for LAA, 3GPP TSG WG1 Meeting #80, R1-150109, Feb. 13, 2015, http://www.3gpp.org/ftp/tsg_ran/WG1_RL1/TSGR1_80/Docs/R1-150109.zip (accessed Oct. 27, 2017).*

ZTE, Frame Structure Design for LAA Considering LBT, 3GPP TSG RAN WG1 Meeting # 80, R1-150154, Feb. 13, 2015, http://www.3gpp.org/ftp/tsg_ran/WG1_RL1/TSGR1_80/Docs/R1-150154.zip (accessed Oct. 27, 2017).*

Alcatel-Lucent Shanghai Bell, Frame Structure Design for LAA, 3GPP TSG RAN WG1 Meeting # 80, R1-150191, Feb. 13, 2015, http://www.3gpp.org/ftp/tsg_ran/WG1_RL1/TSGR1_80/Docs/R1-150191.zip (accessed Oct. 27, 2017).*

Samsung, Discussion on UL Transmission for LAA, 3GPP TSG RAN WG1 #80, R1-150368, Feb. 13, 2015, http://www.3gpp.org/ftp/tsg_ran/WG1_RL1/TSGR1_80/Docs/R1-150368.zip (accessed Oct. 27, 2017).*

MediaTek, R1-151059: LAA frame structure design, Mar. 26, 2015, 3GPP, 3GPP TSG RAN WG1 LAA AdHoc Meeting (Year: 2015).*

Qualcomm, R1-152789: Reservation Signal Design for LAA, May 29, 2015, 3GPP, 3GPP TSG RAN WG1 # 81 (Year: 2015).*

Mediatek, LAA reservation signal design, May 29, 2015, 3GPP, 3GPP TSG RAN WG1 # 81 (Year: 2015).*

Ericsson: "Details of Listen-Before-Talk for LAA," 3GPP Draft; R1-145193, 3rd Generation Partnership Project (3GPP), Mobile Competence Centre; 650, Route Des Lucioles; F-06921 Sophia-Antipolis Cedex; France, vol. RAN WG1, No. San Francisco, USA; Nov. 17, 2014-Nov. 21, 2014, Nov. 13, 2014, XP050895524, Retrieved from the Internet URL: http://www.3gpp.org/ftp/tsg_ran/WG1_RL1/TSGR1_79/Docs/ [retrieved on Nov. 13, 2014], p. 5-p. 7.

Huawei et al., "LBT Functionality and Protocol Impact," 3GPP Draft; R2-150248, 3rd Generation Partnership Project (3GPP), Mobile Competence Centre ; 650, Route Des Lucioles ; F-06921 Sophia-Antipolis Cedex ; France vol. Ran Wg2, no. Athens, Greece; Feb. 9, 2015-Feb. 12, 2015 Jan. 31, 2015 (Jan. 31, 2015), XP050952441, Retrieved from the Internet: URL: http://www.3gpp.org/ftp/tsg_ran/WG2_RL2/TSGR2_89/Docs/ [retrieved on Jan. 31, 2015].

International Search Report and Written Opinion—PCT/US2016/019065—ISA/EPO—dated May 19, 2016.

* cited by examiner

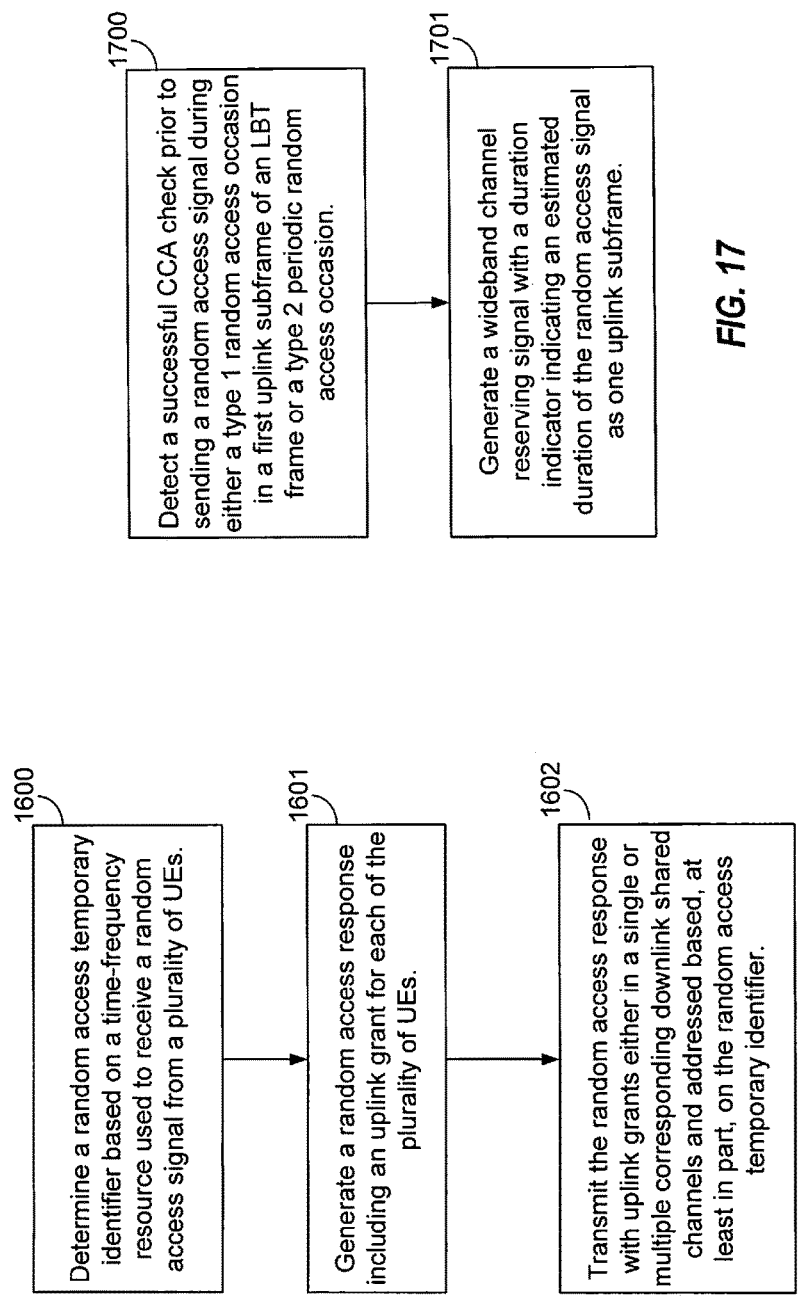

ENHANCED PRACH FOR STANDALONE CONTENTION BASED COMMUNICATIONS INCLUDING UNLICENSED SPECTRUM

CROSS-REFERENCE TO RELATED APPLICATIONS

This application claims the benefit of U.S. Provisional Patent Application No. 62/120,205, entitled, "ENHANCED PRACH FOR STANDALONE CONTENTION-BASED COMMUNICATIONS INCLUDING UNLICENSED SPECTRUM," filed on Feb. 24, 2015, which is expressly incorporated by reference herein in its entirety.

BACKGROUND

Field

Aspects of the present disclosure relate generally to wireless communication systems, and more particularly, to enhanced physical random access channel (ePRACH) for standalone contention-based communication including unlicensed spectrum.

Background

Wireless communication systems are widely deployed to provide various types of communication content, such as voice, video, packet data, messaging, broadcast, or the like. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UEs). A base station may communicate with UEs on downlink channels (e.g., for transmissions from a base station to a UE) and uplink channels (e.g., for transmissions from a UE to a base station).

Some modes of communication may enable communications between a base station and a UE over a contention-based shared radio frequency spectrum band, or over different radio frequency spectrum bands (e.g., a licensed radio frequency spectrum band or an unlicensed radio frequency spectrum band) of a cellular network. With increasing data traffic in cellular networks that use a licensed radio frequency spectrum band, offloading of at least some data traffic to an unlicensed radio frequency spectrum band may provide a cellular operator with opportunities for enhanced data transmission capacity. An unlicensed radio frequency spectrum band may also provide service in areas where access to a licensed radio frequency spectrum band is unavailable.

Prior to gaining access to, and communicating over, a contention-based shared radio frequency spectrum band, a base station or UE may perform a listen before talk (LBT) procedure to contend for access to the shared radio frequency spectrum band. An LBT procedure may include performing a clear channel assessment (CCA) procedure to determine whether a channel of the contention-based shared radio frequency spectrum band is available. When it is determined that the channel of the contention-based shared radio frequency spectrum band is available, a channel reserving signal, such as a channel usage beacon signal (CUBS) may be transmitted to reserve the channel.

SUMMARY

Various aspects of the present disclosure are directed to a method of wireless communication which include determining that data is available for communication over a contention-based transmission band, detecting successful extended clear channel assessment (ECCA) on a contention-based transmission band, determining whether a resynchronization boundary has been reached upon detection of the successful ECCA, wherein the resynchronization boundary synchronizes uplink transmissions for one or more user equipments (UEs) served by a base station. In response to determining the resynchronization boundary has not been reached upon detection of the successful ECCA the method further includes remaining idle until the resynchronization boundary in response to determining the resynchronization boundary has not been reached, performing a clear channel assessment (CCA) check when the resynchronization boundary has been reached, and transmitting a channel reserving signal in response to the CCA check detected as successful.

In an additional aspect of the disclosure, a method of wireless communication includes monitoring for downlink activity signals, determining a next random access occasion in response to detecting no downlink activity signals, detecting a successful CCA prior to the next random access occasion, and transmitting a random access signal at the next random access occasion in response to the successful CCA.

In an additional aspect of the disclosure, a method of wireless communication includes monitoring for a listen before talk (LBT) frame, and in response to detecting no LBT frame, determining a next uplink CCA-exempt transmission (CET), and transmitting a random access signal during the next uplink CET.

In an additional aspect of the disclosure, a method of wireless communication includes monitoring for a LBT frame and determining, in response to detecting the LBT frame, an earlier occasion of either a next scheduled random access occasion within the LBT frame or a next uplink CET. The method further includes transmitting a random access signal after a successful CCA check in response to the earlier occasion being the next scheduled random access occasion and transmitting the random access signal in response to the earlier occasion being the next uplink CET.

In an additional aspect of the disclosure, a method of wireless communication includes determining a UE status triggering a random access procedure, generating a first random access message using a fixed payload size of a predetermined number of fixed payload sizes, wherein the predetermined number of fixed payload sizes is less than a total number of available payload sizes, and transmitting the first random access message to a base station.

In an additional aspect of the disclosure, a method of wireless communication includes determining a next scheduled random access occasion, blindly decoding a received signal during the next scheduled random access occasion using a first fixed payload size of a predetermined number of fixed payload sizes, wherein the predetermined number of fixed payload sizes is less than a total number of available payload sizes, and in response to failing to properly decode a random access signal from the received signal using the first fixed payload size, blindly decoding the received signal using another one of the remaining fixed payload sizes of the predetermined number of fixed payload sizes until the random access signal is decoded.

In an additional aspect of the disclosure, a method of wireless communication includes determining a random access temporary identifier based on a time-frequency resource used to receive a random access signal from a plurality of UEs, generating a random access response including an uplink grant for each of the plurality of UEs, transmitting the random access response addressed based, at least in part, on the random access temporary identifier, wherein the random access response is transmitted in either a single downlink shared channel including the uplink grant for each of the plurality of UEs or a plurality of downlink shared channels, wherein each of the plurality of downlink shared channels includes the uplink grant for each associated UE of the plurality of UEs.

In an additional aspect of the disclosure, a method of wireless communication includes detecting a successful CCA check prior to sending a random access signal during a random access occasion, wherein the random access occasion is either a scheduled random access occasion within a first uplink subframe of a detected LBT frame, or a random access occasion selected in response to detecting no LBT frame, and generating a wideband channel reserving signal in response to the successful CCA, wherein the wideband channel reserving signal includes a duration identifier identifying an estimated duration of the random access signal as one uplink subframe.

In an additional aspect of the disclosure, an apparatus configured for wireless communication includes means for determining that data is available for communication over a contention-based transmission band, means for detecting successful ECCA on a contention-based transmission band, means for determining whether a resynchronization boundary has been reached upon detection of the successful ECCA, wherein the resynchronization boundary synchronizes uplink transmissions for one or more UEs served by a base station. In response to determining the resynchronization boundary has not been reached upon detection of the successful ECCA the apparatus further includes means for remaining idle until the resynchronization boundary in response to determining the resynchronization boundary has not been reached, means for performing a CCA check when the resynchronization boundary has been reached, and means for transmitting a channel reserving signal in response to the CCA check detected as successful.

In an additional aspect of the disclosure, an apparatus configured for wireless communication includes means for monitoring for downlink activity signals, means for determining a next random access occasion in response to detecting no downlink activity signals, means for detecting a successful CCA prior to the next random access occasion, and means for transmitting a random access signal at the next random access occasion in response to the successful CCA.

In an additional aspect of the disclosure, an apparatus configured for wireless communication includes means for monitoring for a LBT frame, and in response to detecting no LBT frame, means for determining a next uplink CET, and means for transmitting a random access signal during the next uplink CET.

In an additional aspect of the disclosure, an apparatus configured for wireless communication includes means for monitoring for a LBT frame and means for determining, in response to detecting the LBT frame, an earlier occasion of either a next scheduled random access occasion within the LBT frame or a next uplink CET. The apparatus further includes means for transmitting a random access signal after a successful CCA check in response to the earlier occasion being the next scheduled random access occasion and means for transmitting the random access signal in response to the earlier occasion being the next uplink CET.

In an additional aspect of the disclosure, an apparatus configured for wireless communication includes means for determining a UE status triggering a random access procedure, means for generating a first random access message using a fixed payload size of a predetermined number of fixed payload sizes, wherein the predetermined number of fixed payload sizes is less than a total number of available payload sizes, and means for transmitting the first random access message to a base station.

In an additional aspect of the disclosure, an apparatus configured for wireless communication includes means for determining a next scheduled random access occasion, means for blindly decoding a received signal during the next scheduled random access occasion using a first fixed payload size of a predetermined number of fixed payload sizes, wherein the predetermined number of fixed payload sizes is less than a total number of available payload sizes, and in response to failing to properly decode a random access signal from the received signal using the first fixed payload size, means for blindly decoding the received signal using another one of the remaining fixed payload sizes of the predetermined number of fixed payload sizes until the random access signal is decoded.

In an additional aspect of the disclosure, an apparatus configured for wireless communication includes means for determining a random access temporary identifier based on a time-frequency resource used to receive a random access signal from a plurality of UEs, means for generating a random access response including an uplink grant for each of the plurality of UEs, means for transmitting the random access response addressed based, at least in part, on the random access temporary identifier, wherein the random access response is transmitted in either a single downlink shared channel including the uplink grant for each of the plurality of UEs or a plurality of downlink shared channels, wherein each of the plurality of downlink shared channels includes the uplink grant for each associated UE of the plurality of UEs.

In an additional aspect of the disclosure, an apparatus configured for wireless communication includes means for detecting a successful CCA check prior to sending a random access signal during a random access occasion, wherein the random access occasion is either a scheduled random access occasion within a first uplink subframe of a detected LBT frame, or a random access occasion selected in response to detecting no LBT frame, and means for generating a wideband channel reserving signal in response to the successful CCA, wherein the wideband channel reserving signal includes a duration identifier identifying an estimated duration of the random access signal as one uplink subframe.

In an additional aspect of the disclosure, a computer-readable medium having program code recorded thereon. This program code includes code to determine that data is available for communication over a contention-based transmission band, code to detect successful ECCA on a contention-based transmission band, code to determine whether a resynchronization boundary has been reached upon detection of the successful ECCA, wherein the resynchronization boundary synchronizes uplink transmissions for one or more UEs served by a base station. In response to determining the resynchronization boundary has not been reached upon detection of the successful ECCA the program code further includes code to remain idle until the resynchronization boundary in response to determining the resynchronization boundary has not been reached, code to perform a CCA check when the resynchronization boundary has been reached, and code to transmit a channel reserving signal in response to the CCA check detected as successful.

In an additional aspect of the disclosure, a computer-readable medium having program code recorded thereon. This program code includes code to monitor for downlink activity signals, code to determine a next random access occasion in response to detecting no downlink activity signals, code to detect a successful CCA prior to the next random access occasion, and code to transmit a random access signal at the next random access occasion in response to the successful CCA.

In an additional aspect of the disclosure, a computer-readable medium having program code recorded thereon. This program code includes code to monitor for a LBT frame, and in response to detecting no LBT frame, code to determine a next uplink CET, and code to transmit a random access signal during the next uplink CET.

In an additional aspect of the disclosure, a computer-readable medium having program code recorded thereon. This program code includes code to monitor for a LBT frame and code to determine, in response to detecting the LBT frame, an earlier occasion of either a next scheduled random access occasion within the LBT frame or a next uplink CET. The program code further includes code to transmit a random access signal after a successful CCA check in response to the earlier occasion being the next scheduled random access occasion and code to transmit the random access signal in response to the earlier occasion being the next uplink CET.

In an additional aspect of the disclosure, a computer-readable medium having program code recorded thereon. This program code includes code to determine a UE status triggering a random access procedure, code to generate a first random access message using a fixed payload size of a predetermined number of fixed payload sizes, wherein the predetermined number of fixed payload sizes is less than a total number of available payload sizes, and code to transmit the first random access message to a base station.

In an additional aspect of the disclosure, a computer-readable medium having program code recorded thereon. This program code includes code to determine a next scheduled random access occasion, code to blindly decode a received signal during the next scheduled random access occasion using a first fixed payload size of a predetermined number of fixed payload sizes, wherein the predetermined number of fixed payload sizes is less than a total number of available payload sizes, and in response to failing to properly decode a random access signal from the received signal using the first fixed payload size, code to blindly decode the received signal using another one of the remaining fixed payload sizes of the predetermined number of fixed payload sizes until the random access signal is decoded.

In an additional aspect of the disclosure, a computer-readable medium having program code recorded thereon. This program code includes code to determine a random access temporary identifier based on a time-frequency resource used to receive a random access signal from a plurality of UEs, code to generate a random access response including an uplink grant for each of the plurality of UEs, code to transmit the random access response addressed based, at least in part, on the random access temporary identifier, wherein the random access response is transmitted in either a single downlink shared channel including the uplink grant for each of the plurality of UEs or a plurality of downlink shared channels, wherein each of the plurality of downlink shared channels includes the uplink grant for each associated UE of the plurality of UEs.

In an additional aspect of the disclosure, a computer-readable medium having program code recorded thereon. This program code includes code to detect a successful CCA check prior to sending a random access signal during a random access occasion, wherein the random access occasion is either a scheduled random access occasion within a first uplink subframe of a detected LBT frame, or a random access occasion selected in response to detecting no LBT frame, and code to generate a wideband channel reserving signal in response to the successful CCA, wherein the wideband channel reserving signal includes a duration identifier identifying an estimated duration of the random access signal as one uplink subframe.

In an additional aspect of the disclosure, an apparatus includes at least one processor and a memory coupled to the processor. The processor is configured to determine that data is available for communication over a contention-based transmission band, to detect successful ECCA on a contention-based transmission band, to determine whether a resynchronization boundary has been reached upon detection of the successful ECCA, wherein the resynchronization boundary synchronizes uplink transmissions for one or more UEs served by a base station. In response to determining the resynchronization boundary has not been reached upon detection of the successful ECCA the program further includes to remain idle until the resynchronization boundary in response to determining the resynchronization boundary has not been reached, to perform a CCA check when the resynchronization boundary has been reached, and to transmit a channel reserving signal in response to the CCA check detected as successful.

In an additional aspect of the disclosure, an apparatus includes at least one processor and a memory coupled to the processor. The processor is configured to monitor for downlink activity signals, to determine a next random access occasion in response to detecting no downlink activity signals, to detect a successful CCA prior to the next random access occasion, and to transmit a random access signal at the next random access occasion in response to the successful CCA.

In an additional aspect of the disclosure, an apparatus includes at least one processor and a memory coupled to the processor. The processor is configured to monitor for a LBT frame, and in response to detecting no LBT frame, to determine a next uplink CET, and to transmit a random access signal during the next uplink CET.

In an additional aspect of the disclosure, an apparatus includes at least one processor and a memory coupled to the processor. The processor is configured to monitor for a LBT frame and to determine, in response to detecting the LBT frame, an earlier occasion of either a next scheduled random access occasion within the LBT frame or a next uplink CET. The program further includes to transmit a random access signal after a successful CCA check in response to the earlier occasion being the next scheduled random access occasion and to transmit the random access signal in response to the earlier occasion being the next uplink CET.

In an additional aspect of the disclosure, an apparatus includes at least one processor and a memory coupled to the processor. The processor is configured to determine a UE status triggering a random access procedure, to generate a first random access message using a fixed payload size of a predetermined number of fixed payload sizes, wherein the predetermined number of fixed payload sizes is less than a total number of available payload sizes, and to transmit the first random access message to a base station.

In an additional aspect of the disclosure, an apparatus includes at least one processor and a memory coupled to the processor. The processor is configured to determine a next scheduled random access occasion, to blindly decode a received signal during the next scheduled random access occasion using a first fixed payload size of a predetermined number of fixed payload sizes, wherein the predetermined number of fixed payload sizes is less than a total number of available payload sizes, and in response to failing to properly decode a random access signal from the received signal using the first fixed payload size, to blindly decode the received signal using another one of the remaining fixed payload sizes of the predetermined number of fixed payload sizes until the random access signal is decoded.

In an additional aspect of the disclosure, an apparatus includes at least one processor and a memory coupled to the processor. The processor is configured to determine a random access temporary identifier based on a time-frequency resource used to receive a random access signal from a plurality of UEs, to generate a random access response including an uplink grant for each of the plurality of UEs, to transmit the random access response addressed based, at least in part, on the random access temporary identifier, wherein the random access response is transmitted in either a single downlink shared channel including the uplink grant for each of the plurality of UEs or a plurality of downlink shared channels, wherein each of the plurality of downlink shared channels includes the uplink grant for each associated UE of the plurality of UEs.

In an additional aspect of the disclosure, an apparatus includes at least one processor and a memory coupled to the processor. The processor is configured to detect a successful CCA check prior to sending a random access signal during a random access occasion, wherein the random access occasion is either a scheduled random access occasion within a first uplink subframe of a detected LBT frame, or a random access occasion selected in response to detecting no LBT frame, and to generate a wideband channel reserving signal in response to the successful CCA, wherein the wideband channel reserving signal includes a duration identifier identifying an estimated duration of the random access signal as one uplink subframe.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label.

Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 12-17 are block diagrams illustrating example blocks executed to implement aspects of the present disclosure.

DETAILED DESCRIPTION

Figure 1:
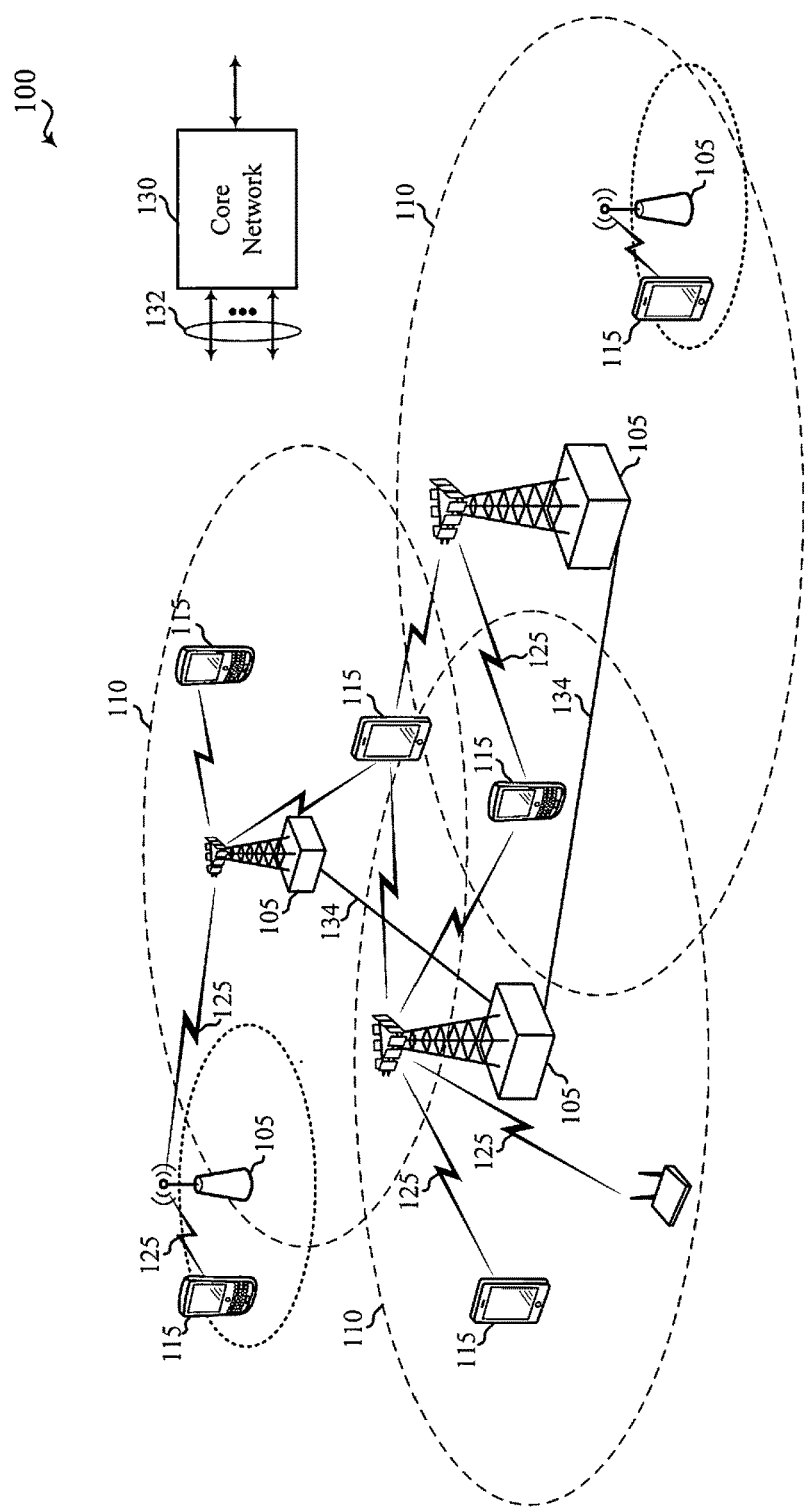
FIG. 1 shows a diagram that illustrates an example of a wireless communications system according to various embodiments.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Techniques are described in which an unlicensed radio frequency spectrum band is used for at least a portion of contention-based communications over a wireless communication system. In some examples, a contention-based shared radio frequency spectrum band may be used for Long Term Evolution (LTE) communications or LTE-Advanced (LTE-A) communications. The contention-based radio frequency spectrum band may be used in combination with, or independent from, a non-contention licensed radio frequency spectrum band. In some examples, the contention-based radio frequency spectrum band may be a radio frequency spectrum band for which a device may also need to contend for access because the radio frequency spectrum band is available, at least in part, for unlicensed use, such as WiFi use.

With increasing data traffic in cellular networks that use a licensed radio frequency spectrum band, offloading of at least some data traffic to a contention-based shared radio frequency spectrum band, such as in an unlicensed band, may provide a cellular operator (e.g., an operator of a public land mobile network (PLMN) or a coordinated set of base stations defining a cellular network, such as an LTE/LTE-A network) with opportunities for enhanced data transmission capacity. As noted above, before communicating over a contention-based shared radio frequency spectrum band, such as unlicensed spectrum, devices may perform an LBT procedure to gain access to the shared radio frequency spectrum band. Such an LBT procedure may include performing a CCA procedure (or an extended CCA procedure) to determine whether a channel of the unlicensed radio frequency spectrum band is available. When it is determined that the channel of the contention-based radio frequency spectrum band is available, a channel reserving signal (e.g., a CUBS) may be transmitted to reserve the channel. When it is determined that a channel is not available, a CCA procedure (or extended CCA procedure) may be performed for the channel again at a later time.

When a base station and/or a UE includes multiple antenna ports capable of transmitting over the contention-based shared radio frequency spectrum band, transmissions from different antenna ports may interfere with one another due to correlation between transmitted signals. For a channel reserving signal used to reserve a channel of a contention-based shared radio frequency spectrum band, reduction of interference due to correlation between transmitted signals may be important to provide good detection capabilities for reserving the channel, and to prevent false detection that would unnecessarily reserve the channel and prevent other devices from using the channel. To reduce such interference due to cross-correlation of signals from different antennas or auto-correlation of a signal from a single antenna, the base station or the UE may generate a sequence based at least in part on an antenna port identifier associated with an antenna port that transmits the sequence of the channel reserving signal. In this way, correlation of channel reserving signals may be reduced, thereby improving detection capabilities of the signal transmission, resulting in more effective and accurate reservations of a channel of the contention-based shared radio frequency spectrum band.

In other words, for a channel reserving signal used to reserve a channel of an unlicensed radio frequency spectrum band, the channel reserving signal should be configured with good detectability to reduce false alarms, so that the channel reservation may be easily detected by other devices trying to access the shared radio frequency spectrum band. Thus, the channel reserving signal sequence should have good auto-correlation properties and good cross-correlation properties with sequences from neighbor base stations. For example, a primary synchronization signal (PSS), a secondary synchronization signal (SSS), and/or a channel state information-reference signal (CSI-RS) may not have good auto-correlation properties or good cross-correlation properties between different base stations in the contention-based shared radio frequency spectrum band. Thus, the channel reserving signal sequence should be configured based at least in part on an antenna port identifier to provide good auto-correlation and cross-correlation properties.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is an illustration of an example wireless communication system 100, in accordance with various aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with other base stations 105 over backhaul links 134 (e.g., X2, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions from a UE 115 to a base station 105. The downlink transmissions may also be called forward link transmissions, while the uplink transmissions may also be called reverse link transmissions. In some examples, UL transmissions may include transmissions of uplink control information, which uplink control information may be transmitted over an uplink control channel (e.g., a physical uplink control channel (PUCCH) or enhanced PUCCH (ePUCCH)). The uplink control information may include, for example, acknowledgements or non-acknowledgements of downlink transmissions, or channel state information. Uplink transmissions may also include transmissions of data, which data may be transmitted over a physical uplink shared channel (PUSCH) or enhanced PUSCH (ePUSCH). Uplink transmissions may also include the transmission of a sounding reference signal (SRS) or enhanced SRS (eSRS), a physical random access channel (PRACH) or enhanced PRACH (ePRACH) (e.g., in a dual connectivity mode or the standalone mode described with reference to FIGS. 2A and 2B), or a scheduling request (SR) or enhanced SR (eSR) (e.g., in the standalone mode described with reference to FIGS. 2A and 2B). References in this disclosure to a PUCCH, a PUSCH, a PRACH, an SRS, or an SR are presumed to inherently include references to a respective ePUCCH, ePUSCH, ePRACH, eSRS, or eSR.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some aspects of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

The wireless communication system 100 may also or alternatively support operation over a non-contention licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or a contention-based shared radio frequency spectrum band (e.g., an unlicensed radio frequency spectrum band for which transmitting apparatuses may need to contend for access because the radio frequency spectrum band is available for unlicensed use, such as WiFi use). Upon winning a contention for access to the contention-based shared radio frequency spectrum band, a transmitting apparatus (e.g., a base station 105 or UE 115) may transmit one or more channel reserving signals (e.g., one or more CUBS) over the unlicensed radio frequency spectrum band. The channel reserving signals may serve to reserve the unlicensed radio frequency spectrum by providing a detectable energy on the unlicensed radio frequency spectrum band. The channel reserving signals may also serve to identify a transmitting apparatus and/or a transmitting antenna, or may serve to synchronize the transmitting apparatus and a receiving apparatus. In some examples, a channel reserving signal transmission may commence at a symbol period boundary (e.g., an OFDM symbol period boundary). In other examples, a CUBS transmission may commence between symbol period boundaries.

The number and arrangement of components shown in FIG. 1 are provided as an example. In practice, wireless communication system 100 may include additional devices, fewer devices, different devices, or differently arranged devices than those shown in FIG. 1. Additionally, or alternatively, a set of devices (e.g., one or more devices) of wireless communication system 100 may perform one or more functions described as being performed by another set of devices of wireless communication system 100.

Figure 2A:
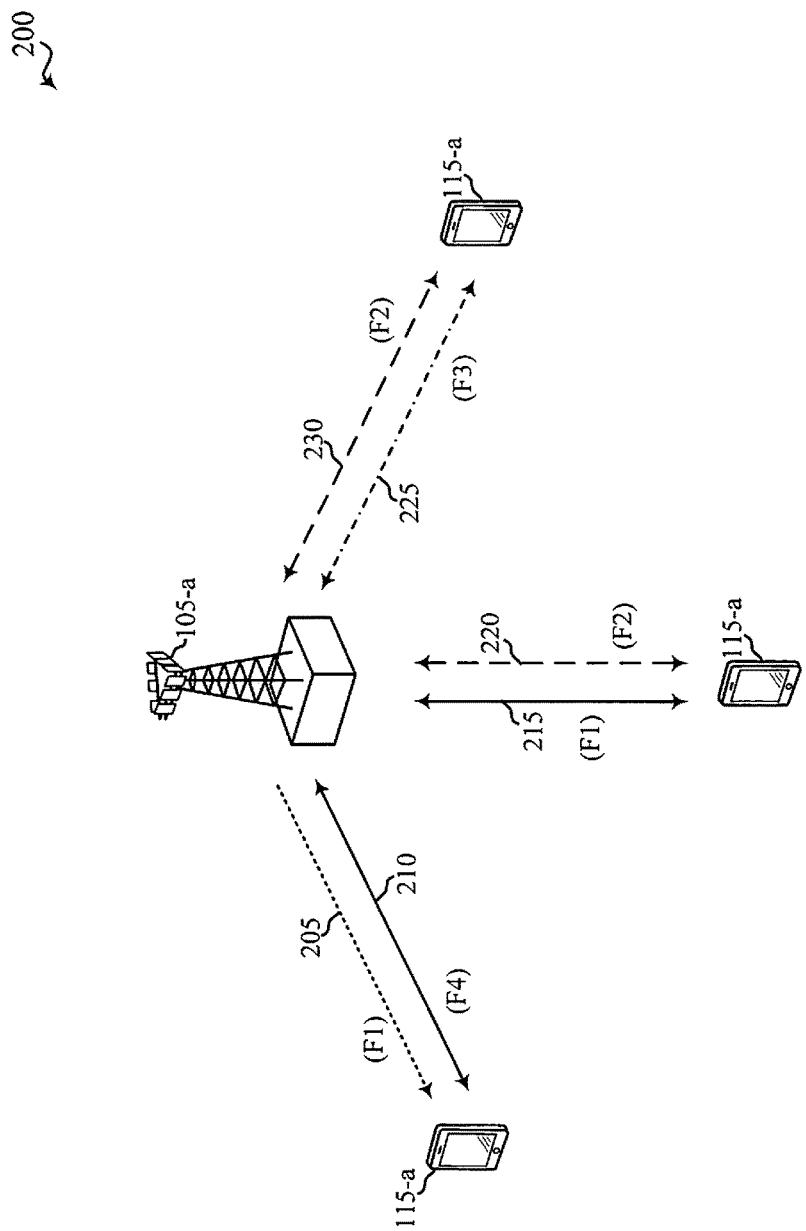
FIG. 2A shows a diagram that illustrates examples of deployment scenarios for using LTE in an unlicensed spectrum according to various embodiments.

Turning next to FIG. 2A, a diagram 200 shows examples of a supplemental downlink mode (e.g., licensed assisted access (LAA) mode) and of a carrier aggregation mode for an LTE network that supports LTE/LTE-A extended to contention-based shared spectrum. The diagram 200 may be an example of portions of the system 100 of FIG. 1. Moreover, the base station 105-a may be an example of the base stations 105 of FIG. 1, while the UEs 115-a may be examples of the UEs 115 of FIG. 1.

In the example of a supplemental downlink mode (e.g., LAA mode) in diagram 200, the base station 105-a may transmit OFDMA communications signals to a UE 115-a using a downlink 205. The downlink 205 is associated with a frequency F1 in an unlicensed spectrum. The base station 105-a may transmit OFDMA communications signals to the same UE 115-a using a bidirectional link 210 and may receive SC-FDMA communications signals from that UE 115-a using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-a. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-a may transmit OFDMA communications signals to a UE 115-a using a bidirectional link 215 and may receive SC-FDMA communications signals from the same UE 115-a using the bidirectional link 215. The bidirectional link 215 is associated with the frequency F1 in the unlicensed spectrum. The base station 105-a may also transmit OFDMA communications signals to the same UE 115-a using a bidirectional link 220 and may receive SC-FDMA communications signals from the same UE 115-a using the bidirectional link 220. The bidirectional link 220 is associated with a frequency F2 in a licensed spectrum. The bidirectional link 215 may provide a downlink and uplink capacity offload for the base station 105-a. Like the supplemental downlink (e.g., LAA mode) described above, this scenario may occur with any service provider (e.g., MNO) that uses a licensed spectrum and needs to relieve some of the traffic and/or signaling congestion.

In another example of a carrier aggregation mode in diagram 200, the base station 105-a may transmit OFDMA communications signals to a UE 115-a using a bidirectional link 225 and may receive SC-FDMA communications signals from the same UE 115-a using the bidirectional link 225. The bidirectional link 225 is associated with the frequency F3 in an unlicensed spectrum. The base station 105-a may also transmit OFDMA communications signals to the same UE 115-a using a bidirectional link 230 and may receive SC-FDMA communications signals from the same UE 115-a using the bidirectional link 230. The bidirectional link 230 is associated with the frequency F2 in the licensed spectrum. The bidirectional link 225 may provide a downlink and uplink capacity offload for the base station 105-a. This example and those provided above are presented for illustrative purposes and there may be other similar modes of operation or deployment scenarios that combine LTE/LTE-A with or without contention-based shared spectrum for capacity offload.

As described above, the typical service provider that may benefit from the capacity offload offered by using LTE/LTE-A extended to contention-based spectrum is a traditional MNO with LTE spectrum. For these service providers, an operational configuration may include a bootstrapped mode (e.g., supplemental downlink (e.g., LAA mode), carrier aggregation) that uses the LTE primary component carrier (PCC) on the non-contention spectrum and the LTE secondary component carrier (SCC) on the contention-based spectrum.

In the supplemental downlink mode, control for LTE/LTE-A extended to contention-based spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in an unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in LTE (e.g., bidirectional links 210, 220, and 230) while data may be communicated in LTE/LTE-A extended to contention-based shared spectrum (e.g., bidirectional links 215 and 225). The carrier aggregation mechanisms supported when using LTE/LTE-A extended to contention-based shared spectrum may fall under a hybrid frequency division duplexing-time division duplexing (FDD-TDD) carrier aggregation or a TDD-TDD carrier aggregation with different symmetry across component carriers.

Figure 2B:
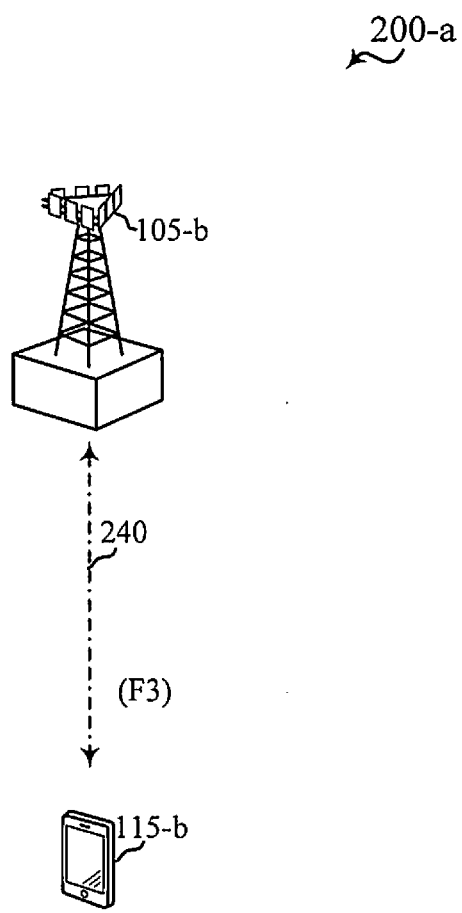
FIG. 2B shows a diagram that illustrates another example of a deployment scenario for using LTE in an unlicensed spectrum according to various embodiments.

FIG. 2B shows a diagram 200-a that illustrates an example of a standalone mode for LTE/LTE-A extended to contention-based shared spectrum. The diagram 200-a may be an example of portions of the system 100 of FIG. 1. Moreover, the base station 105-b may be an example of the base stations 105 of FIG. 1 and the base station 105-a of FIG. 2A, while the UE 115-b may be an example of the UEs 115 of FIG. 1 and the UEs 115-a of FIG. 2A.

In the example of a standalone mode in diagram 200-a, the base station 105-b may transmit OFDMA communications signals to the UE 115-*b* using a bidirectional link 240 and may receive SC-FDMA communications signals from the UE 115-*b* using the bidirectional link 240. The bidirectional link 240 is associated with the frequency F3 in a contention-based shared spectrum described above with reference to FIG. 2A. The standalone mode may be used in non-traditional wireless access scenarios, such as in-stadium access (e.g., unicast, multicast). An example of the typical service provider for this mode of operation may be a stadium owner, cable company, event hosts, hotels, enterprises, and large corporations that do not have licensed spectrum. For these service providers, an operational configuration for the standalone mode may use the PCC on the contention-based spectrum. Moreover, LBT may be implemented on both the base station and the UE.

In some examples, a transmitting apparatus such as one of the base stations 105, 205, or 205-*a* described with reference to FIG. 1, 2A, or 2B, or one of the UEs 115, 215, 215-*a*, 215-*b*, or 215-*c* described with reference to FIG. 1, 2A, or 2B, may use a gating interval to gain access to a channel of a contention-based shared radio frequency spectrum band (e.g., to a physical channel of an unlicensed radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based at least in part on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of a contention-based shared radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the contention-based shared radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

The number and arrangement of components shown in FIGS. 2A and 2B are provided as an example. In practice, wireless communication system 200 may include additional devices, fewer devices, different devices, or differently arranged devices than those shown in FIGS. 2A and 2B.

Figure 3:
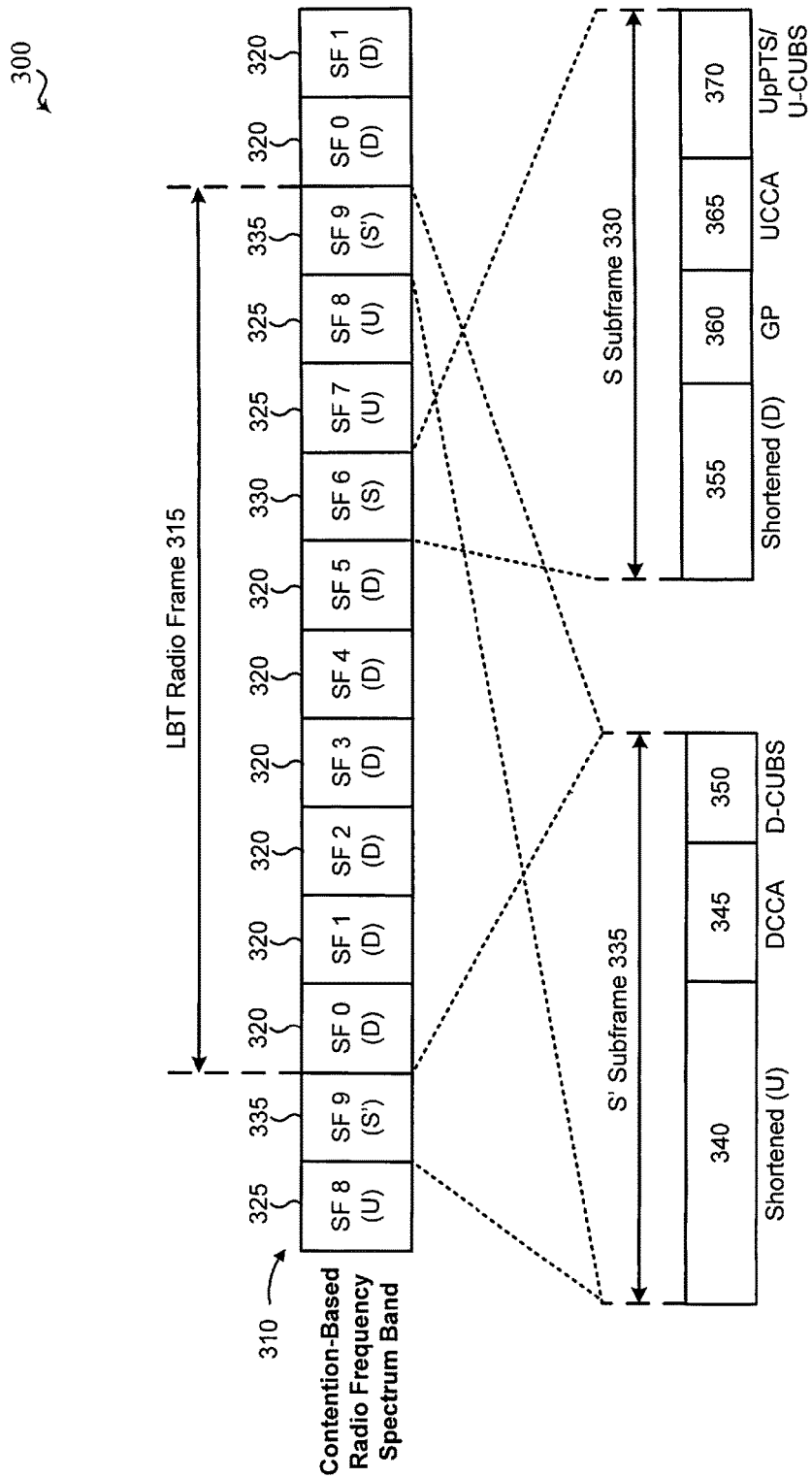
FIG. 3 shows a diagram that illustrates an example of carrier aggregation when using LTE concurrently in licensed and unlicensed spectrum according to various embodiments.

FIG. 3 is an illustration of an example 300 of a wireless communication 310 over an unlicensed radio frequency spectrum band, in accordance with various aspects of the present disclosure. In some examples, an LBT radio frame 315 may have a duration of ten milliseconds and include a number of downlink (D) subframes 320, a number of uplink (U) subframes 325, and two types of special subframes, an S subframe 330 and an S' subframe 335. The S subframe 330 may provide a transition between downlink subframes 320 and uplink subframes 325, while the S' subframe 335 may provide a transition between uplink subframes 325 and downlink subframes 320 and, in some examples, a transition between LBT radio frames.

During the S' subframe 335, a downlink clear channel assessment (CCA) procedure 345 may be performed by one or more base stations, such as one or more of the base stations 105, 205, or 205-*a* described with reference to FIG. 1 or 2, to reserve, for a period of time, a channel of the contention-based shared radio frequency spectrum band over which the wireless communication 310 occurs. Following a successful downlink CCA procedure 345 by a base station, the base station may transmit a preamble, such as a channel usage beacon signal (CUBS) (e.g., a downlink CUBS (D-CUBS 350)) to provide an indication to other base stations or apparatuses (e.g., UEs, WiFi access points, etc.) that the base station has reserved the channel. In some examples, a D-CUBS 350 may be transmitted using a plurality of interleaved resource blocks. Transmitting a D-CUBS 350 in this manner may enable the D-CUBS 350 to occupy at least a certain percentage of the available frequency bandwidth of the contention-based shared radio frequency spectrum band and satisfy one or more regulatory requirements (e.g., a requirement that transmissions over an unlicensed radio frequency spectrum band occupy at least 80% of the available frequency bandwidth). The D-CUBS 350 may in some examples take a form similar to that of an LTE/LTE-A cell-specific reference signal (CRS) or a channel state information reference signal (CSI-RS). When the downlink CCA procedure 345 fails, the D-CUBS 350 may not be transmitted.

The S' subframe 335 may include a plurality of OFDM symbol periods (e.g., 14 OFDM symbol periods). A first portion of the S' subframe 335 may be used by a number of UEs as a shortened uplink (U) period 340. A second portion of the S' subframe 335 may be used for the downlink CCA procedure 345. A third portion of the S' subframe 335 may be used by one or more base stations that successfully contend for access to the channel of the contention-based shared radio frequency spectrum band to transmit the D-CUBS 350.

During the S subframe 330, an uplink CCA procedure 365 may be performed by one or more UEs, such as one or more of the UEs 115, 215, 215-*a*, 215-*b*, or 215-*c* described above with reference to FIG. 1, 2A, or 2B, to reserve, for a period of time, the channel over which the wireless communication 310 occurs. Following a successful uplink CCA procedure 365 by a UE, the UE may transmit a preamble, such as an uplink CUBS (U-CUBS 370) to provide an indication to other UEs or apparatuses (e.g., base stations, WiFi access points, etc.) that the UE has reserved the channel. In some examples, a U-CUBS 370 may be transmitted using a plurality of interleaved resource blocks. Transmitting a U-CUBS 370 in this manner may enable the U-CUBS 370 to occupy at least a certain percentage of the available frequency bandwidth of the contention-based radio frequency spectrum band and satisfy one or more regulatory requirements (e.g., the requirement that transmissions over the contention-based radio frequency spectrum band occupy at least 80% of the available frequency bandwidth). The U-CUBS 370 may in some examples take a form similar to that of an LTE/LTE-A CRS or CSI-RS. When the uplink CCA procedure 365 fails, the U-CUBS 370 may not be transmitted.

The S subframe 330 may include a plurality of OFDM symbol periods (e.g., 14 OFDM symbol periods). A first portion of the S subframe 330 may be used by a number of base stations as a shortened downlink (D) period 355. A second portion of the S subframe 330 may be used as a guard period (GP) 360. A third portion of the S subframe 330 may be used for the uplink CCA procedure 365. A fourth portion of the S subframe 330 may be used by one or more UEs that successfully contend for access to the channel of the contention-based radio frequency spectrum band as an uplink pilot time slot (UpPTS) or to transmit the U-CUBS 370.

In some examples, the downlink CCA procedure 345 or the uplink CCA procedure 365 may include the performance of a single CCA procedure. In other examples, the downlink CCA procedure 345 or the uplink CCA procedure 365 may include the performance of an extended CCA procedure. The extended CCA procedure may include a random number of CCA procedures, and in some examples may include a plurality of CCA procedures.

As indicated above, FIG. 3 is provided as an example. Other examples are possible and may differ from what was described in connection with FIG. 3.

Figure 4:
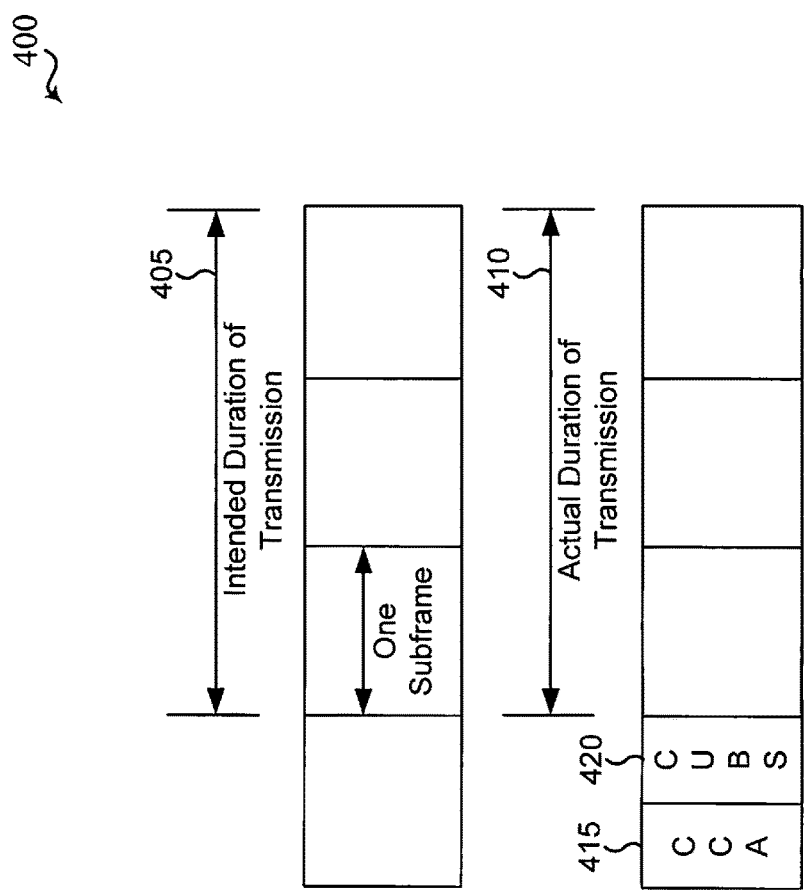
FIG. 4 is a block diagram conceptually illustrating a design of a base station/eNB and a UE configured according to one aspect of the present disclosure.

FIG. 4 is an illustration of an example 400 of a CCA procedure 415 performed by a transmitting apparatus when contending for access to a contention-based shared radio frequency spectrum band, in accordance with various aspects of the present disclosure. In some examples, the CCA procedure 415 may be an example of the downlink CCA procedure 345 or uplink CCA procedure 365 described with reference to FIG. 3. The CCA procedure 415 may have a fixed duration. In some examples, the CCA procedure 415 may be performed in accordance with an LBT-frame based equipment (LBT-FBE) protocol (e.g., the LBT-FBE protocol described by EN 301 893). Following the CCA procedure 415, a channel reserving signal, such as a CUBS 420, may be transmitted, followed by a data transmission (e.g., an uplink transmission or a downlink transmission). By way of example, the data transmission may have an intended duration 405 of three subframes and an actual duration 410 of three subframes.

As indicated above, FIG. 4 is provided as an example. Other examples are possible and may differ from what was described in connection with FIG. 4.

Figure 5:
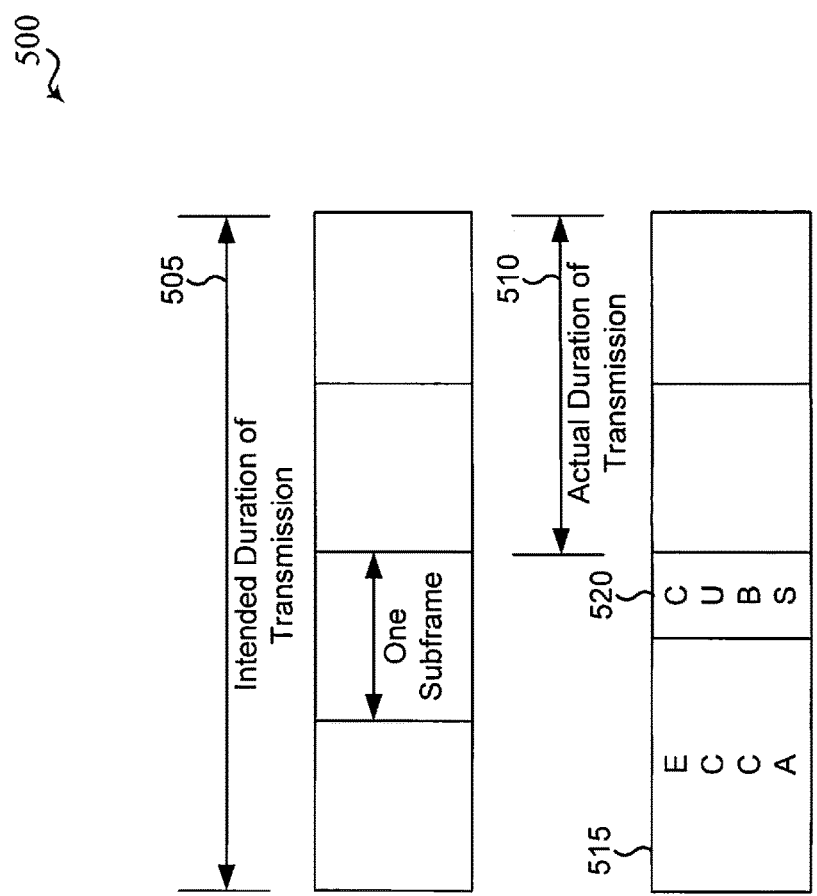
FIG. 5 is an illustration of an example of an extended CCA (ECCA) procedure performed by a transmitting apparatus when contending for access to a contention-based shared radio frequency spectrum band, in accordance with various aspects of the present disclosure.

FIG. 5 is an illustration of an example 500 of an extended CCA (ECCA) procedure 515 performed by a transmitting apparatus when contending for access to a contention-based shared radio frequency spectrum band, in accordance with various aspects of the present disclosure. In some examples, the ECCA procedure 515 may be an example of the downlink CCA procedure 345 or uplink CCA procedure 365 described with reference to FIG. 3. The ECCA procedure 515 may include a random number of CCA procedures, and in some examples may include a plurality of CCA procedures. The ECCA procedure 515 may, therefore, have a variable duration. In some examples, the ECCA procedure 515 may be performed in accordance with an LBT-load based equipment (LBT-LBE) protocol (e.g., the LBT-LBE protocol described by EN 301 893). The ECCA procedure 515 may provide a greater likelihood of winning contention to access the contention-based shared radio frequency spectrum band, but at a potential cost of a shorter data transmission. Following the ECCA procedure 515, a channel reserving signal, such as a CUBS 520, may be transmitted, followed by a data transmission. By way of example, the data transmission may have an intended duration 505 of three subframes and an actual duration 510 of two subframes.

As indicated above, FIG. 5 is provided as an example. Other examples are possible and may differ from what was described in connection with FIG. 5.

Figure 6:
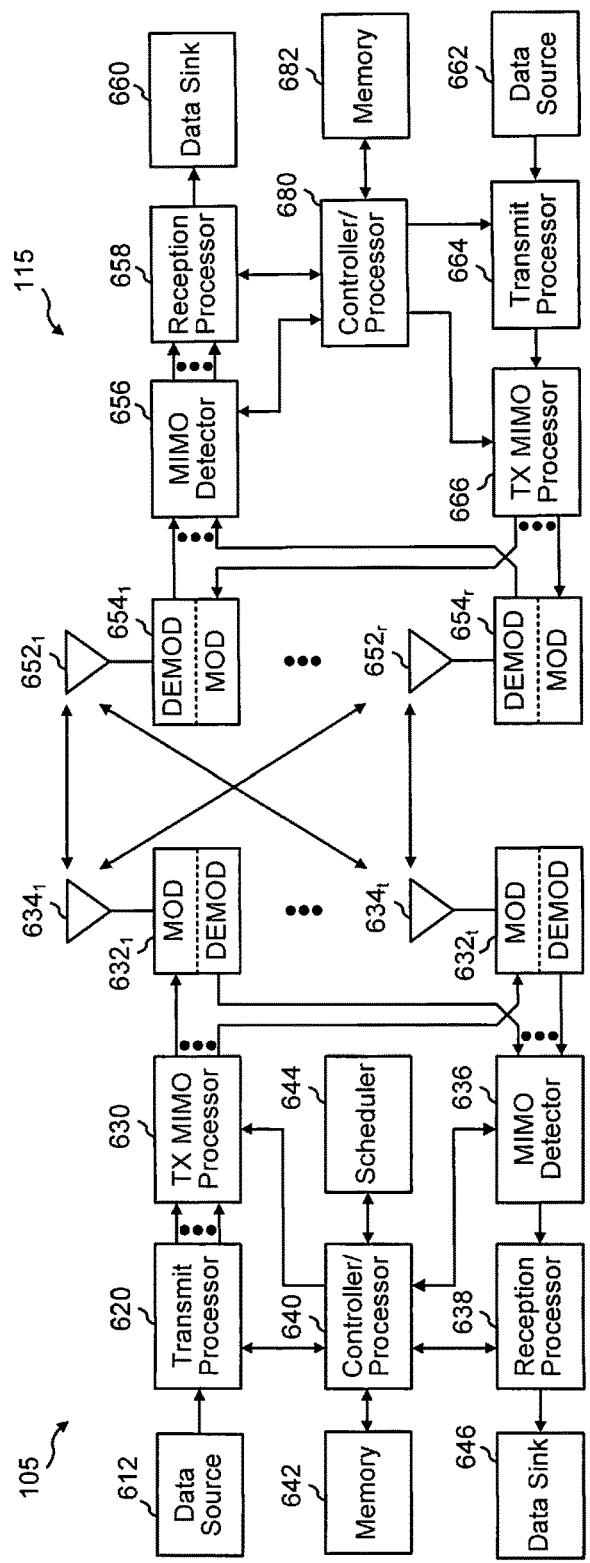
FIG. 6 shows a block diagram of a design of a base station/eNB and a UE, which may be one of the base stations/eNBs and one of the UEs in FIG. 1.

FIG. 6 shows a block diagram of a design of a base station/eNB 105 and a UE 115, which may be one of the base stations/eNBs and one of the UEs in FIG. 1. The eNB 105 may be equipped with antennas 634a through 634t, and the UE 115 may be equipped with antennas 652a through 652r. At the eNB 105, a transmit processor 620 may receive data from a data source 612 and control information from a controller/processor 640. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 620 may process (e.g., encode and symbol map) the data and control information to obtain data symbols and control symbols, respectively. The transmit processor 620 may also generate reference symbols, e.g., for the primary synchronization signal (PSS), secondary synchronization signal (SSS), and cell-specific reference signal. A transmit (TX) multiple-input multiple-output (MIMO) processor 630 may perform spatial processing (e.g., precoding) on the data symbols, the control symbols, and/or the reference symbols, if applicable, and may provide output symbol streams to the modulators (MODs) 632a through 632t. Each modulator 632 may process a respective output symbol stream (e.g., for OFDM, etc.) to obtain an output sample stream. Each modulator 632 may further process (e.g., convert to analog, amplify, filter, and upconvert) the output sample stream to obtain a downlink signal. Downlink signals from modulators 632a through 632t may be transmitted via the antennas 634a through 634t, respectively.

At the UE 115, the antennas 652a through 652r may receive the downlink signals from the eNB 105 and may provide received signals to the demodulators (DEMODs) 654a through 654r, respectively. Each demodulator 654 may condition (e.g., filter, amplify, downconvert, and digitize) a respective received signal to obtain input samples. Each demodulator 654 may further process the input samples (e.g., for OFDM, etc.) to obtain received symbols. A MIMO detector 656 may obtain received symbols from all the demodulators 654a through 654r, perform MIMO detection on the received symbols if applicable, and provide detected symbols. A receive processor 658 may process (e.g., demodulate, deinterleave, and decode) the detected symbols, provide decoded data for the UE 115 to a data sink 660, and provide decoded control information to a controller/processor 680.

On the uplink, at the UE 115, a transmit processor 664 may receive and process data (e.g., for the physical uplink shared channel (PUSCH)) from a data source 662 and control information (e.g., for the physical uplink control channel (PUCCH)) from the controller/processor 680. The transmit processor 664 may also generate reference symbols for a reference signal. The symbols from the transmit processor 664 may be precoded by a TX MIMO processor 666 if applicable, further processed by the demodulators 654a through 654r (e.g., for SC-FDM, etc.), and transmitted to the eNB 105. At the eNB 105, the uplink signals from the UE 115 may be received by the antennas 634, processed by the modulators 632, detected by a MIMO detector 636 if applicable, and further processed by a receive processor 638 to obtain decoded data and control information sent by the UE 115. The processor 638 may provide the decoded data to a data sink 639 and the decoded control information to the controller/processor 640.

The controllers/processors 640 and 680 may direct the operation at the eNB 105 and the UE 115, respectively. The controller/processor 640 and/or other processors and modules at the eNB 105 may perform or direct the execution of various processes for the techniques described herein. The controllers/processor 680 and/or other processors and modules at the UE 115 may also perform or direct the execution of the functional blocks illustrated in FIGS. 7, 9, and 12-17, and/or other processes for the techniques described herein. The memories 642 and 682 may store data and program codes for the eNB 105 and the UE 115, respectively. A scheduler 644 may schedule UEs for data transmission on the downlink and/or uplink.

A device, such as a UE, may have multiple antennas (N) to use for receiving and/or transmitting signals. The device may divide the use and assignment of the antennas to use for particular radio access technologies (RATs), such as LTE, WiFi, etc., for particular carrier frequencies, or both. For example, the device may use a fixed number of antennas for one carrier in CA cases, or it may use a fixed number of antennas for WiFi when the device supports both WiFi and other technologies, such as LTE. In one example, a UE may have four antennas and assign two of the antennas for WiFi communication and two antennas for LTE communications. A device, such as a UE, may also dynamically or semi-statically select a number of antennas for one technology or one carrier (antenna selection). In such dynamic or semi-static schemes, the sharing or selection may be triggered by a particular measurement result, such as channel quality indicator (CQI), reference signal receive power (RSRP), and the like.

Communications networks, such as LTE, may have frequency division multiplexing (FDM) implementations and time division multiplexing (TDM) implementations. Sharing options in FDM implementations are not truly sharing different antennas, but rather sharing the frequency spectrum received over the antenna. For example, a UE may use a diplexer/switch in order to use all antennas at the same time for different air-interfaces. The diplexer/switch acts as a filter by filtering out the unwanted frequencies. However, in such FDM sharing schemes, there is typically a considerable loss in signal strength as the signals are filtered. Such losses can also increase with the higher frequency bands. TDM implementations may actually use or assign separate antennas for each air-interface/technology. Thus, when communications over such air-interfaces/technologies are not in use, those antennas that were assigned or designated for the unused communications may be shared with other air-interfaces/technologies. The various aspects of the present disclosure are directed to communication systems using TDM implementations.

When a UE is switched on for the very first time or the first time after having been off for a considerable period, it will start searching for the network. There are many possible networks that there are many networks or to put in other words, there are many frequencies from different operators available in the air to which a UE (user equipment) can connect. Therefore, a UE synchronizes to each frequency and checks whether this is frequency from the right operator to which it wants to connect to. The UE does this by going through very initial synchronization process. Once synchronized the UE reads the master information block and system information blocks to check whether this is the right PLMN. With the PLMN value indicated as correct, the UE will proceed with reading system information block 1 and system information block 2. The next step is known as Random Access Procedure in which the network for the first time knows that some UE is trying to get access.

At this stage, UE does not have any resource or channel available to inform network about the UE's desire to connect to the network so the UE will send the UE's request over the shared medium. Now there are two possibilities at this stage, either there are many other UEs in the same area (same cell) sending the same request, in which there is also a possibility of collision among the requests coming from various other UEs. Such random access procedure is called contention-based random access procedure. In second scenario, the network can inform the UE to use some unique identity to prevent its request from colliding with requests coming from other UEs. The second scenario is called contention free or non-contention based random access procedure.

The LTE Rel. 8 random access (RA) procedure generally includes four message transmissions (two from the UE and two from the eNB). The four messages are commonly referred to as message 1, message 2, message 3, and message 4. In LTE/LTE-A with contention-based spectrum configured in a standalone (SA) mode, the four-message procedure entails up to four CCA clearances and, thus, it would be desirable to reduce the number of messages. Hence, in LTE/LTE-A with contention-based spectrum, a two-message procedure is adopted. Due to the small cell size in such LTE/LTE-A communication systems including contention-based spectrum, ePRACH may not be used for TA (Timing Advance) because the timing offset would typically be within the cyclic prefix range. However, ePRACH may be used for carrying a combined information of legacy message 1 and 3 in order to perform call setup, HO (Hand Off), or RLF (Radio Link Failure). It may also perform UL Scheduling Request through BSR (Buffer Status Report) for further uplink message consolidation.

The new ePRACH design for LTE/LTE-A communications systems extended with contention-based shared spectrum while in standalone mode may prompt changes to the ePRACH procedures. For example, for ePRACH resources, an ePRACH uses uplink frequency domain resource interlaces in the same way as used in ePUSCH and ePUCCH to meet sufficient bandwidth occupancy requirement (e.g., occupying at least 80% of the available frequency bandwidth). Each ePRACH, therefore, generally uses one interlace consisting of 10 RBs and occupies a 1 ms duration. Each ePRACH is allocated a single cyclic shift per RB.

An ePRACH occasion defines the specific subframe on which the UE is allowed to transmit ePRACH. The most commonly used type 1 ePRACH occasion is an uplink subframe of a virtual LBT frame when D-CUBS/PFFICH is detected. A type 1 ePRACH occasion is subject to a CCA clearance at the eNB as well as the UE. The first uplink subframe is commonly selected for the type 1 ePRACH. In the new design for the ePRACH, the physical channel may also be redesigned in a similar way to the PUCCH format 2 physical channel, which is based on the ePUCCH with a single tailbiting convolution code (TBCC) encoder. This redesigned physical channel allows multiple users to share the ePRACH resource as well as carrying significant payload size. The ePRACH payload length and content may, thus, be modified to increase the maximum payload size. For example, ePRACH payload size or length may include a new maximum of up to 200 coded bits (e.g., 20 (PUCCH format 2 per RB)*10 (RBs per interlace)=200). Such a coding rate may be achieved using a variety of TBCC encoding or other variable coding rates.

Because an ePRACH signal may be initiated for a variety of different reasons or UE statuses, the actual payload length of the first message varies. For example, the ePRACH payload length for a variable message 1 may include any of the following: for call setup, medium access control (MAC) header (1 byte)+radio resource control (RRC) connection request message (6 bytes)=7 bytes, for radio link failure (RLF): MAC header (1 byte)+RRC connection reestablishment request message (6 bytes)=7 bytes, for handover: MAC header (2 bytes)+MAC control element (CE) cell radio network temporary identifier (CRNTI) (2 bytes)+RRC connection reconfiguration complete message (2 bytes)=6 bytes, for uplink scheduling request (SR): MAC header (2 bytes)+MAC CE (CRNTI) (2)+BSR (1 or 3 bytes)=5 or 7 bytes. After the addition of a 16-bit cyclic redundancy check (CRC), the lowest coding rate generally results approximately with a rate of 72/200=0.36.

Because the UE has yet to establish a first connection with the base station prior to the random access procedure, a temporary identifier may be used to identify which UE is performing the random access. A UE performing random access will use a random access (RA)-RNTI when initiating the random access procedure through message 1. However, the RA-RNTI is not a value selected and transmitted by the UE, but is instead determined by the eNB receiving the random access message based on the time-frequency resources used by the UE. Time-frequency resources may include the time slot number (e.g., subframe number) and frequency interlace (e.g., six possible frequency interlaces in TDD mode and only one in FDD) in which the random access preamble is sent. In general, the RA-RNTI is determined according to the following equation:

$$\text{RA-RNTI}=1+t_{id}+10*f_{id} \quad (1)$$

where $t_{id}$ is the subframe number typically in a range between 0 and 9, and $f_{id}$, when used in TDD mode, is the interlace selection typically in a range between 0 and 5, or 0, when used in FDD mode. The UE may pick one preamble out of 64 available preambles and send it in message 1 in a particular subframe, $t_{id}$, and interlace, $f_{id}$. As the base station detects the preamble of the received message 1, it will calculate the RA-RNTI and code its random access response message in message 2 using the RA-RNTI in order to acknowledge reception of the preamble from the UE.

There are up to 64 random access preambles. The preamble index may be sent using 6 bits of the MAC payload for the random access response (RAR). Multiple preambles may also be sent for RAR in the same message 2 from the responding base station. When a UE receives the message 2 using the same RA-RNTI, and, if preamble match, the UE will continue to message 3 of the random access procedure for contention resolution. Once a UE sends message 1, the UE will have to receive the message 2 within a predetermined RAR window. In example implementations, a RAR window may be less than 10 ms and up to 40 ms, depending on the configuration of the network.

In LTE/LTE-A communication systems that have been extended to contention-based shared frequency spectrum, competition for the available spectrum will often occur with legacy WiFi devices. In order to facilitate coexistence with the legacy WiFi devices, the channel reserving signal transmitted by UEs and base stations of such extended LTE/LTE-A communication systems may include wideband CUBS (W-CUBS) configured specifically for dual WiFi-LTE/LTE-A decoding. The W-CUBS format may be selected to correspond to the IEEE 802.11-compliant CTS-to-Self packet. The 802.11-compliant CTS-to-Self signal allows WiFi devices to send clear-to-send (CTS) messages to itself, in a broadcast-type mechanism. It is a protection mechanism in mixed-mode environments where different WiFi technologies exist. The CTS-to-Self message also includes information about the time during which the network will be occupied by the sender of the CTS-to-Self device. Thus, other WiFi devices will be able to receive this information about the network usage. The configuration of W-CUBS, therefore, will allow LTE/LTE-A devices operating on the contention-based shared frequencies to send information on the amount of time the network will be occupied that can be consumed by all compliant devices contending for the shared resources, including LTE/LTE-A and WiFi receivers. Based on the identity of the W-CUBS originator different actions can be contemplated at the receiver.

Referring back to FIG. 3, in scenarios with multiple UEs being served by the same base station, if one UE clears ECCA/CCA first and begins transmitting U-CUBS in the S subframe 330 prior to any of the other UEs clearing ECCA/CCA, the other UEs will be blocked from uplink transmissions as their ECCA/CCA will not pass while the first UE is transmitting U-CUBS. In order to avoid this situation, aspects of the present disclosure operate to synchronize U-CUBS transmissions from multiple UEs served within the same coverage area.

Figure 7:
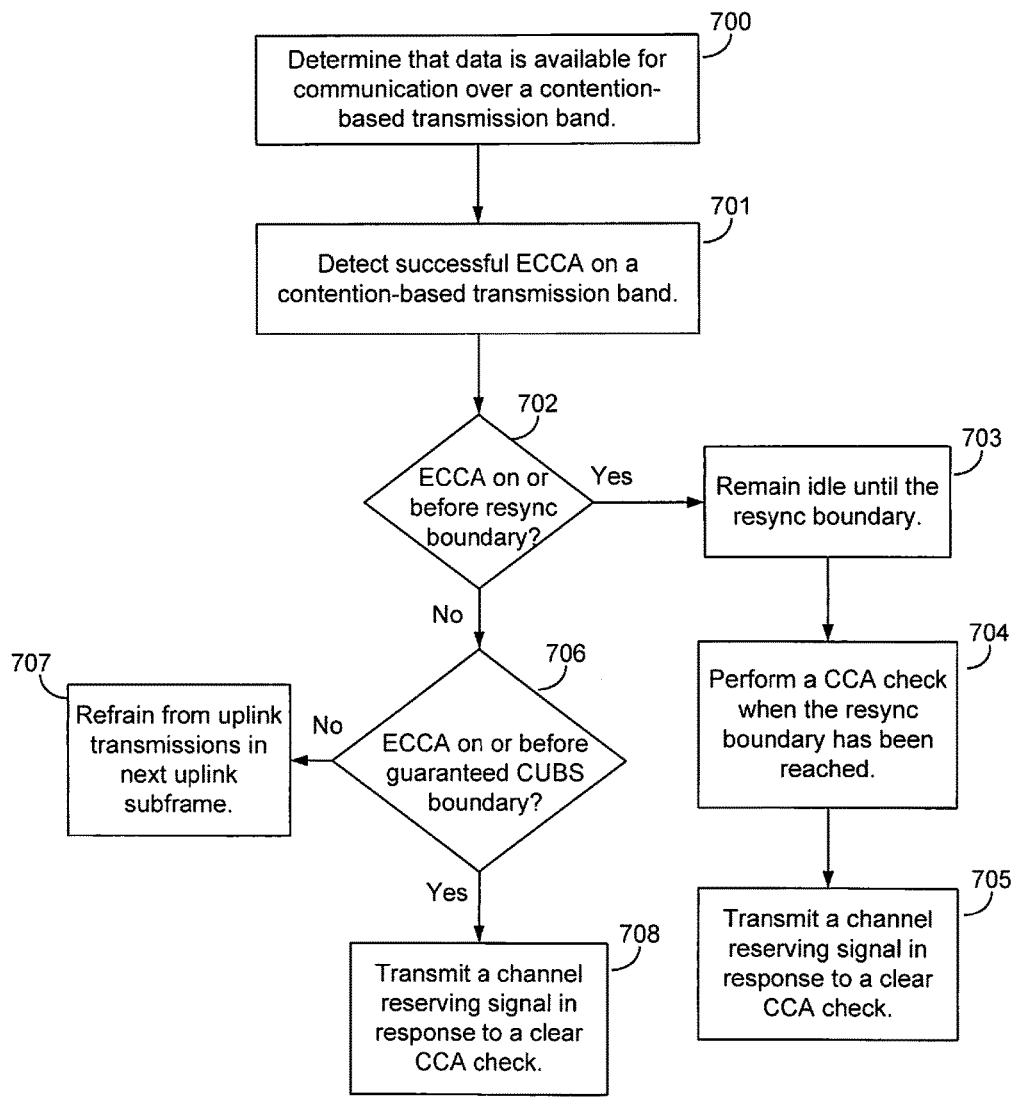
FIG. 7 is a block diagram illustrating example blocks executed to implement one aspect of the present disclosure.

FIG. 7 is a block diagram illustrating example blocks executed to implement one aspect of the present disclosure. At block 700, a UE, such as UE 115, will determine that it has data available for communication over a contention-based transmission band. As a UE detects or generates data that is to be communicated. The UE may be perform a random number of CCA checks as part of an ECCA process to reserve the contention-based channel.

At block 701, the UE detects a successful ECCA on the contention-based channel. Once the successful ECCA is detected, the UE determines, at block 702, whether an uplink resync boundary has been reached upon detection of the successful ECCA. The uplink resync boundary is used to synchronize uplink transmissions in time and prevents uplink transmissions of one UE blocking the ECCA procedure at other co-scheduled UEs so that FDM scheduling can be applied. A typical resync boundary may be set according to the following equation:

$$N(r,s)+\in, \quad (2)$$

where $N(r,s)$ is a pseudo random number between 1 and Q and corresponds to the number of CCA checks that will be performed to accomplish an ECCA procedure. Q, is the selected value of the parameter q, which is a selected number between 4 and 32, inclusive. The parameter q is used in determining the maximum channel occupancy time (13/32*q ms). The value for Q may be selected in order to meet the minimum channel occupancy requirements in systems configured for contention-based shared spectrum that includes unlicensed frequency bands. In contemplated operations of such contention-based systems, each CCA check takes 20 μs. Selecting Q to be 25, would result in a channel occupancy time of 0.5 ms (25*20 μs) for a successful ECCA procedure. Considering the maximum LBT frame length is 10 ms, 0.5/10 ms=5% occupancy, which satisfies the channel idle time requirements of unlicensed spectrum. The pseudo random selection of $N(r,s)$ between 1 and Q is based on a function of the radio frame number, r, corresponding to the system frame number (SFN), and the subframe number, s. The additional parameter, $\in$, represents an additional preconfigured overhead time that would all a WiFi acknowledgement packet to be transmitted. $\in \geq 0$.

A resync boundary position may be calculated according to equation (2) which will position the boundary either equal or prior to the guaranteed CUBS boundary. The guaranteed CUBS boundary is the minimum duration of U-CUBS that could be transmitted on a subframe before any uplink channels (e.g., ePRACH, ePUCCH, ePUSCH, and the like) are transmitted on the next uplink subframe. Typical resync boundaries may be determined such that a UE would be able to transmit a W-CUBS (x μs, for example, x=44 μs)+a minimum number of special U-CUBS (SU-CUBS) to align with the closest symbol boundary+one U-CUBS (one symbol), if U-CUBS will use the demodulation reference signal (DM-RS) of the next uplink channel and be used to help decoding. Alternatively, a resync boundary may be determined such that the UE would be able to transmit a W-CUBS (x µs, for example, x=40 µs)+minimum number of SU-CUBS to align with the closest symbol boundary if U-CUBS will not be used by the base station.

At block 703, if the UE determines that the resync boundary has not been reached when the successful ECCA is detected, the UE will remain idle until the resync boundary. At block 704, the UE performs a CCA check when the resync boundary is reached and transmits a channel reserving signal, at block 705, in response to detecting a clear CCA check.

If the UE detects that the successful ECCA is detected after the resync boundary, at block 702, then, at block 703, the UE performs a determination of whether the successful ECCA is detected on or before the guaranteed CUBS boundary. If the successful ECCA is detected after the guaranteed CUBS boundary, then, at block 707, the UE will refrain from uplink transmissions during the next uplink subframe. Otherwise, if the ECCA is successful after the resync boundary but on or before the guaranteed CUBS boundary, then, at block 708, the UE will transmit the channel reserving signals as soon as the successful ECCA is detected. The channel reserving signals transmitted at blocks 705 and 708 may be a type of CUBS or a sequence of different CUBS, such as W-CUBS+SU-CUBS+U-CUBS or W-CUBS+SU-CUBS, or the like, as noted above.

Figure 8:
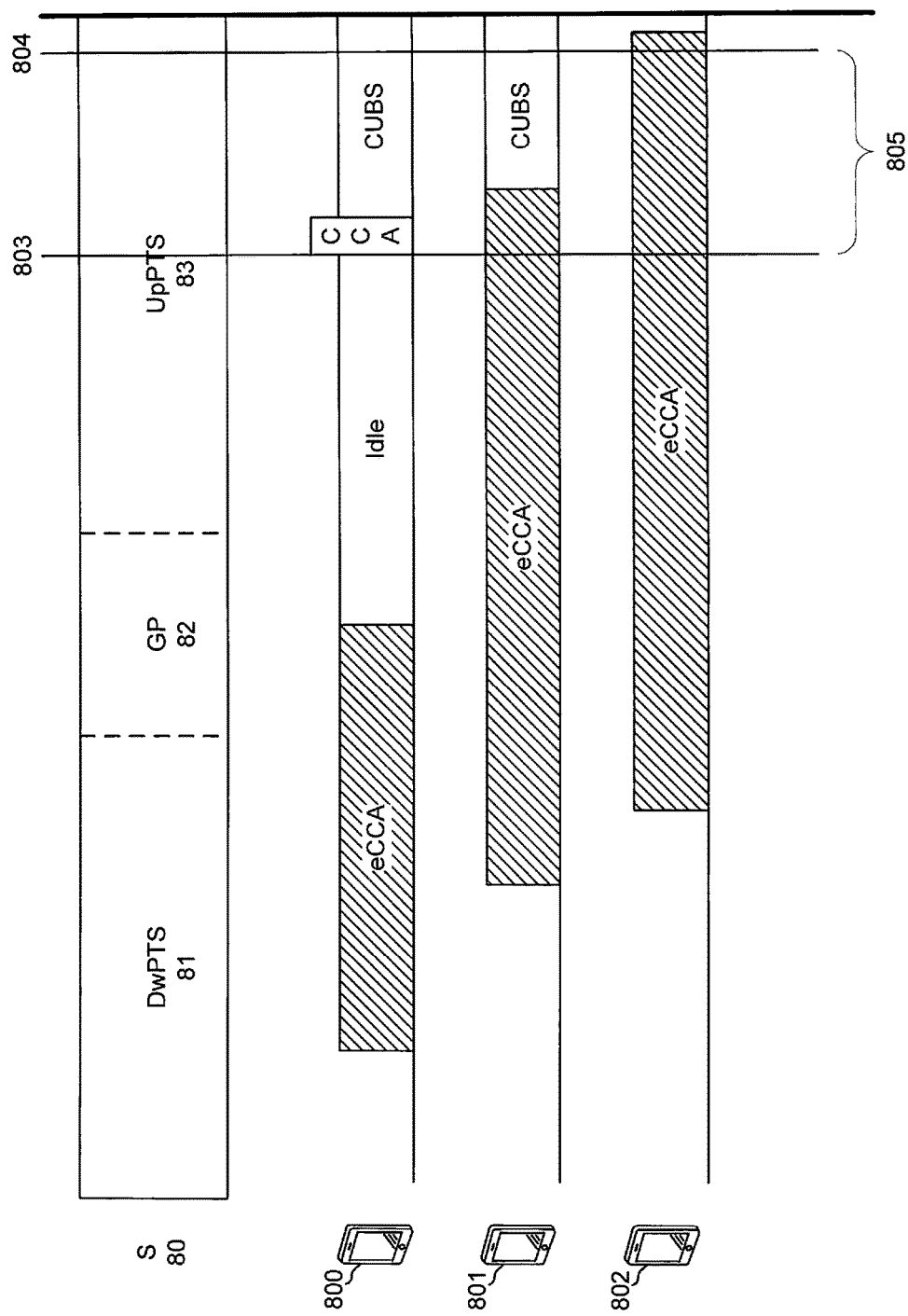
FIG. 8 is a block diagram illustrating UEs configured according to aspects of the present disclosure.

FIG. 8 is a block diagram illustrating UEs 800-802 configured according to aspects of the present disclosure. UEs 800-802 are served by the same base station (not shown, but which may be configured similarly to base station 105) and are each engaged in communications in a contention-based shared frequency spectrum. UEs 800-802 each identify data for uplink transmissions and engage in ECCA processes. Subframe S 80 in the transmission frame of communication between the base station and UEs 800-802 includes a downlink portion, DwPTS 81, a guard period, GP 82, and an uplink portion, UpPTS 83. An uplink resync boundary 803 has been set within UpPTS 83, while the guaranteed CUBS boundary is determined to be at 804.

UE 800 detects a successful ECCA process during GP 82. Because resync boundary 803 has not yet occurred, UE 800 remains idle until reaching resync boundary 803. UE 800 will then perform a CCA check before transmitting CUBS for the remainder of UpPTS 83 of S subframe 80. UE 800 will only transmit CUBS if it detects the clear CCA check.

UE 801 detects a successful ECCA process during UpPTS 83. UE 801 determines that the successful ECCA has occurred after resync boundary 803, but before guaranteed CUBS boundary 804. Because of this positioning, UE 801 begins immediately transmitting CUBS in UpPTS 83 after detecting the successful ECCA process.

UE 802 also detects a successful ECCA process during UpPTS 83. However, UE 801 determines that the successful ECCA has occurred both after resync boundary 803 and after guaranteed CUBS boundary 804. Because there is not enough time for successful CUBS transmissions after guaranteed CUBS boundary 804, UE 801 will refrain from uplink transmissions in the next uplink subframe.

Resync boundary 803 may be determined according to equation (2). However, as noted above, typical placements of resync boundary 803 may occur within resync boundary window 805, which is on or before guaranteed CUBS boundary 804. Various implementations and example instances may place resync boundary 803 at any point within resync boundary window 805 depending on the configuration of the network and location of the transmission within the transmission frame (e.g., the SFN and subframe number of the current transmission).

When conducting ePRACH procedures in a contention-based shared frequency spectrum, the ePRACH occasion in an LBT frame depends on the activity of the base station, as well as CCA clearances at both the base station and UE. If the base station is idle due to a lack of downlink/uplink traffic, there could be period of time without any LBT frame. Moreover, if CCA clearance time becomes an issue either at the base station or the UE, the typical scheduled ePRACH occasion in the LBT frame also cannot be used, which may cause delay in random access or uplink scheduling.

Various additional aspects of the present disclosure provide for two new ePRACH occasion types. The existing ePRACH occasion that may be scheduled during the LBT frame will be referred to as the type 1 ePRACH occasion. A first new type, a type 2 ePRACH occasion, may be configured as ePRACH occasions when an LBT frame cannot be detected by a UE. The ePRACH occasions may be scheduled with some periodicity. However, the transmission by the UE will be dependent upon a clear CCA check. Thus, the frequency at which such random access signals are transmitted may be more flexible than a strict periodicity. That is, an eNB could configure a periodicity and duration for a UE to send type 2 ePRACH when an LBT frame cannot be detected by the UE. On each period, within the configured duration, if the UE does not detect any downlink activity, it may start sending ePRACH within the window if it is supposed to send ePRACH. However, if the UE fails to successfully conduct a CCA check on the first subframe within the window, it may attempt again on the subsequent subframe within the window until the UE tries all subframes within the window. The type 2 ePRACH occasions would be subject to CCA clearance only at a participating UE. The other new type, the type 3 ePRACH occasion, is configured for transmissions during uplink CCA-exempt transmission (U-CET) periods at the CET periodicity (e.g., CET periodicity is currently defined at 80 ms). Because the type 3 ePRACH occasion is configured during a U-CET period, it is CCA exempt.

Figure 9:
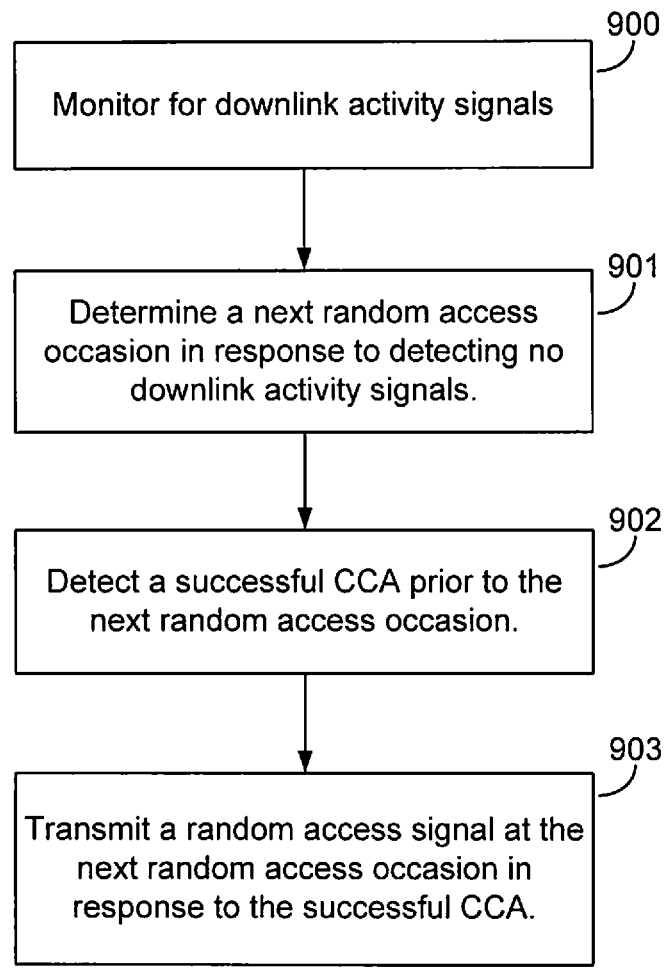
FIG. 9 is a block diagram illustrating example blocks executed to implement one aspect of the present disclosure.

FIG. 9 is a block diagram illustrating example blocks executed to implement one aspect of the present disclosure. At block 900, a UE, such as UE 115, monitors for downlink activity signals. A type 2 ePRACH occasion may occur only if the downlink CUBS (D-CUBS) or physical frame format indicator channel (PFFICH) for a frame or any other downlink activity signal is not detected. This non-detected downlink activity signal may be due to the base station being idle or because of an unsuccessful detection attempt of the downlink activity signal transmitted by the base station for the frame. Thus, when a random access procedure is considered at a UE, the UE may first listen for any downlink activity signals, which include at least D-CUBS and/or PFFICH.

At block 901, the UE determines a next random access occasion in response to failing to detect any downlink activity signals or the UE fails to successfully conduct a CCA check in the previous occasions. Type 2 ePRACH occasions may be used when a UE fails to detect or accurately decode D-CUBS/PFFICH in order to mitigate delay in case of an idle base station. The type 2 ePRACH occasion may be configured periodically in a set of physical subframes. For example, type 2 ePRACH occasions may be configured to the set of subframes that satisfy the following condition:

$$\text{Mod}(sfi+10*N_f, M_{ePRACH,Type\ 2}) = O_{ePRACH,Type\ 2} \qquad (3)$$

where $N_f$ represents the physical system frame number (SFN), sfi represents the physical subframe index, $M_{ePRACH, Type\ 2}$ represents the periodicity of the type 2 ePRACH occasion, which may be broadcasted in eSIB1. An example range of values for type 2 ePRACH occasion periodicity may include 1, 2, 5, 10, 20, 40 ms, and the like. $O_{ePRACH, Type\ 2}$ represents the subframe offsets. Because the periodicity of the periodic type 2 ePRACH occasion may be broadcast in a SIB message, the UE would be able to determine the type 2 ePRACH occasions.

At block 902, the UE will perform a CCA check and detect a successful CCA prior to the next random access occasion. In response to the clear CCA check, the UE will transmit a random access signal, at block 903, at the next random access occasion.

Figure 10:
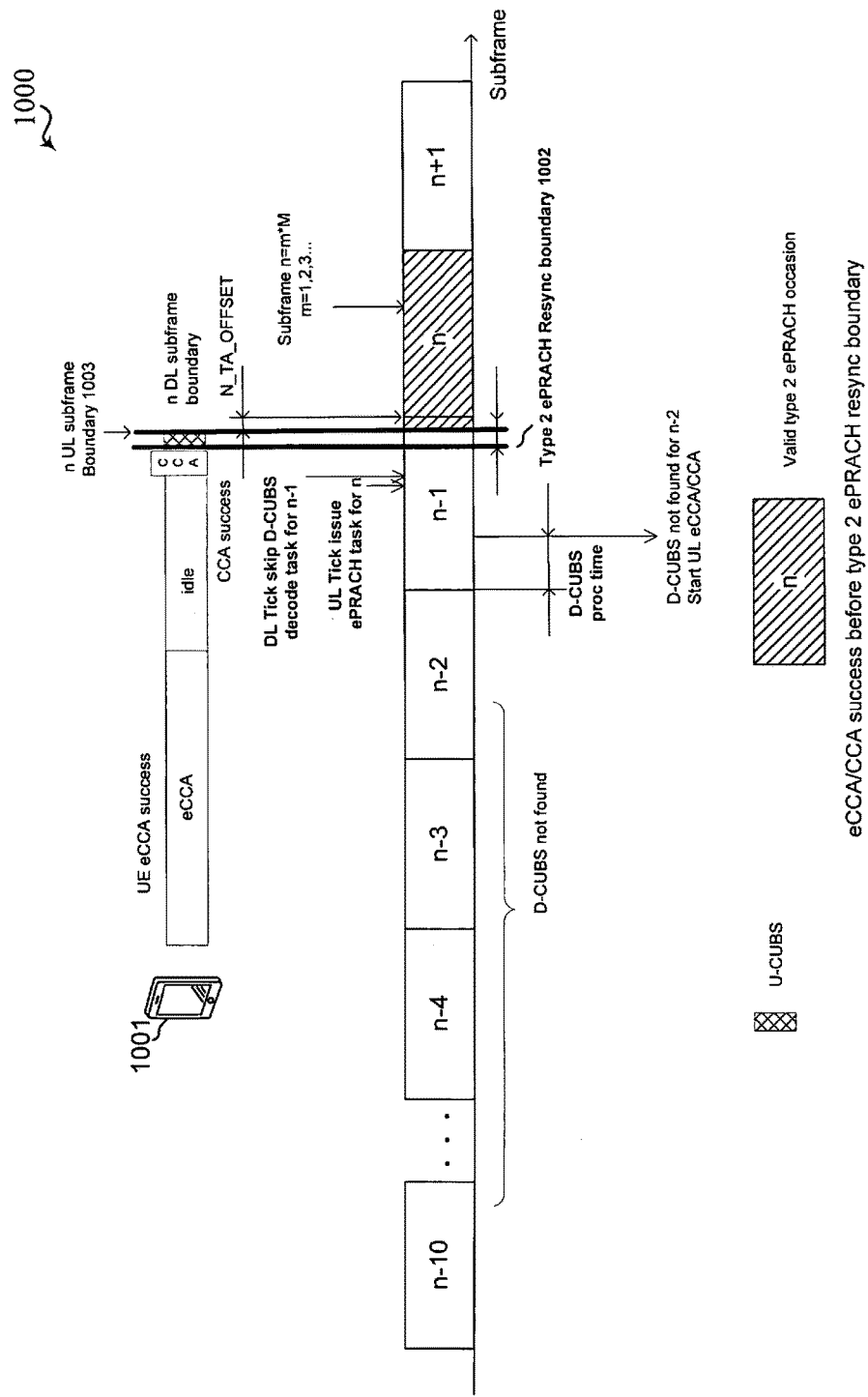
FIG. 10 is a block diagram illustrating a communication stream involving a UE configured according to one aspect of the present disclosure.

FIG. 10 is a block diagram illustrating communication stream 1000 involving UE 1001 configured according to one aspect of the present disclosure. A type 2 ePRACH occasion in subframe n (n=sfi+10*sfn) is further subject to UE 1001's failure to detect D-CUBS/PFFICH in subframes n−2, n−3, . . . , and n−10. Moreover, the UE should detect a successful ECCA/CCA at or before a type 2 ePRACH re-sync boundary 1002 for the subframe n satisfying equation (3). If either of these conditions are not met, the corresponding type 2 ePRACH occasion expires.

A UE, such as UE 1001, cannot simultaneously process downlink and uplink transmissions. Therefore, should UE 1001 attempt to transmit a type 2 ePRACH transmission in subframe n, UE 1001 could miss any D-CUBS or other downlink transmissions in subframe n−1 or n. UE 1001's U-CUBS and ePRACH transmissions could collide with a base station's D-CUBS and/or other downlink transmission, such as from base station 105. It should be noted, however, that the probability of such collisions is very low. Additionally, UE 1001 would likely recover in the next LBT frame. If UE 1001 would detect D-CUBS in subframe n−2, the type 2 ePRACH occasion at subframe n will also expire to avoid collision with downlink transmissions from the base station. In such an instance, UE 1001 would use the next scheduled ePRACH occasion in an LBT frame, as the detection of D-CUBS indicates the activity of the base station and, as such, indicates the LBT frame.

It should be noted that in various aspects of the present disclosure, if a UE has a fast turnaround time line, the UE could even try to detect a downlink signal at subframe n−1 and determine whether subframe n may be used for ePRACH transmission.

As illustrated in FIG. 10, subframe n is a type 2 ePRACH occasion. Resync boundary 1002 is located at subframe n−1. In some example aspects, resync boundary 1002 for a type 2 ePRACH occasion may be set at the guaranteed CUBS boundary in order to allow a higher priority for the base station to reserve the channel if a collision between uplink and downlink occurs. The additional time for resync boundary 1002 resulting from setting resync boundary at the guaranteed CUBS boundary allows for the processing time involved in D-CUBS/PFFICH detection in subframe n−1 to be completed. Thus, there would be more occasions actually detecting D-CUBS prior to the UE reserving the channel through the ePRACH process However, a side effect of increasing the priority for the base station to reserve the channel is that the priority for WiFi to reserve the channel is also increased.

It should be noted that one alternative to increase the chances for UE 1001 to reserve the channel would be to set a smaller value for the type 2 occasion periodicity, M. The increased periodicity would provide more type 2 ePRACH occasions for UE 1001 to select from. In another alternative aspect, the type 2 ePRACH resync boundary can be made more aggressive for UEs than others since it is a control channel which can be ahead of the data. In such case, the UE can skip D-CUBS/PFFICH decode tasks for both n−2 and n−1. Then set resync boundary as earlier as possible and ignore N(r,s) since it is for control.

Providing for range of subframes within which downlink activity signals may be detected may be selected in order to ensure that a channel detected as idle is idle because the base station is, in fact, idle, and not because the base station simply cannot successfully reserve the channel. In such aspects, the range of frames in which a UE may attempt to detect downlink activity signals may be selected as a range between n−M and n−2, where M is a predefined constant that satisfies the relationship: N≤M≤(maximum LBT frame length+N), wherein N depends on the UE processing timeline. The selection of M may be based on the statistics of how many subframes a UE will maintain ECCA/CCA before it can reserve the channel. Assuming a turnaround time is N, where within the N subframes, the UE is able to determine that there is no downlink transmission up to subframe n−N, and perform a CCA check, prepare PRACH signal generation, and start transmission accordingly. The UE will not be able to detect any downlink activity starting within the N subframes. Hence the latest downlink activity the UE can detect is the activity on subframe n−(N+1). It is possible that the eNB may indeed send downlink signals during those N subframes. This may be the case when the eNB cannot successfully secure the channel or medium, which, in such case, the eNB would try to reserve the channel and transmit every subframe. As a results, the UE may miss the downlink transmission or there may be a collision between uplink and downlink transmissions. Because of this, the UE may monitor for downlink activity from subframe n−K until subframe n−N and then transmit if there is no downlink activity in all subframes from n−K until subframe n−N, instead of simply making a decision based only on the downlink activity on subframe n−(N+1). On the other hand, a much larger M implies that the UE may attempt to observe the channel or transmission medium unoccupied for a relatively long time before it can transmit, which reduces its PRACH transmission probability. If M is selected to be equal to the (maximum LBT frame length+N), it means that the UE has observed that the eNB has not transmitted downlink signals for the entire maximum LBT duration before the UE begins to prepare PRACH transmissions. The likelihood of the eNB not being able to reserve the channel within the entire maximum LBT duration is much smaller and, therefore, the maximum LBT duration may be used as the upper bound for M. The maximum LBT frame length is typically based on the maximum random number used for an eNB to access the medium. Alternatively, it may be specified by different standards such as 3GPP (e.g., 8 ms) or ETSI (e.g., 6 ms).

Figure 11:
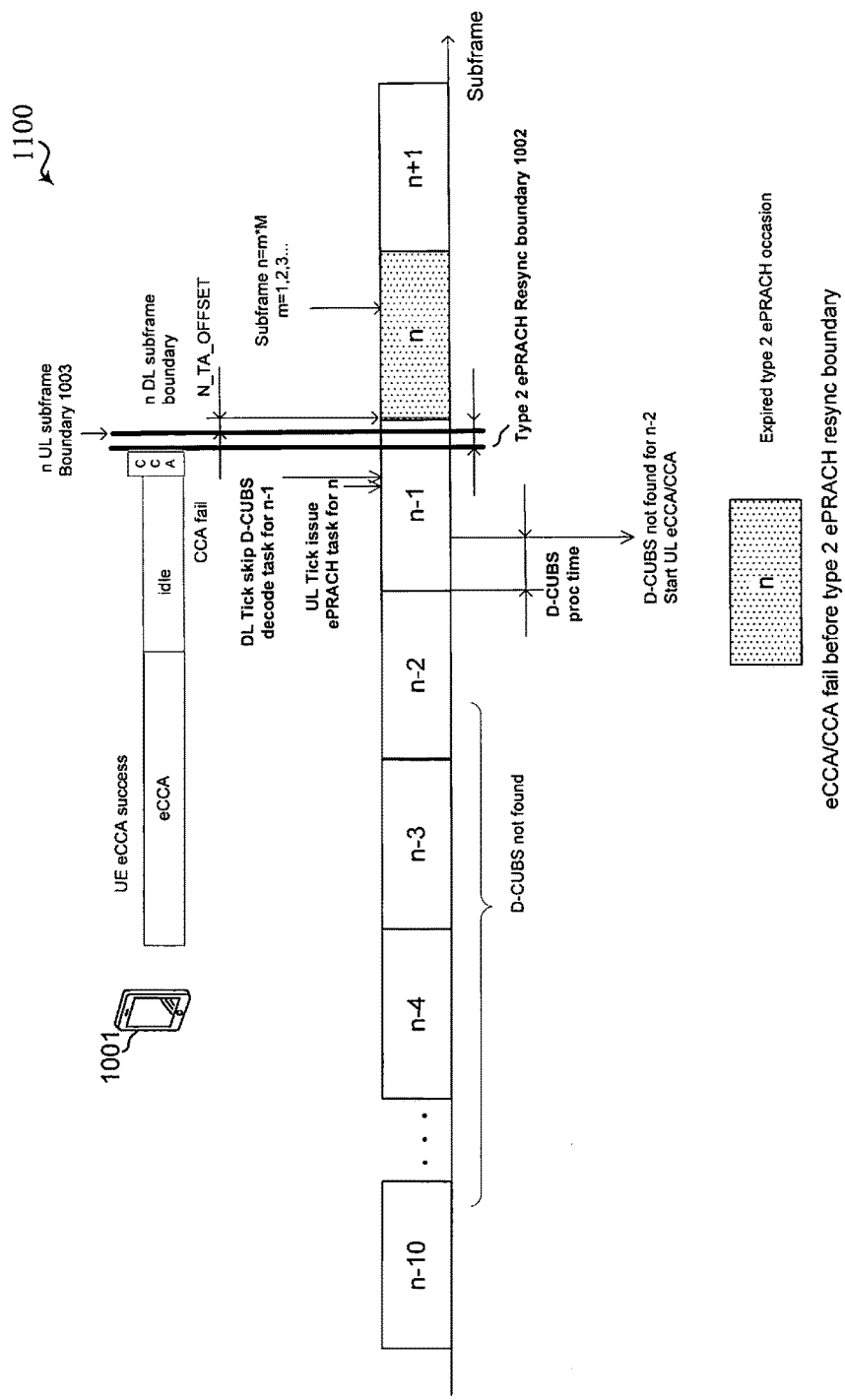
FIG. 11 is a block diagram illustrating a communication stream involving a UE configured according to one aspect of the present disclosure.

FIG. 11 is a block diagram illustrating communication stream 1100 involving UE 1001 configured according to one aspect of the present disclosure. In the example instance illustrated in FIG. 11, the CCA attempt of UE 1001 fails just before resync boundary 1002. Because UE 1001 does not have a successful CCA attempt prior to resync boundary 1002, the type 2 ePRACH occasion at subframe n expires.

Figure 12:
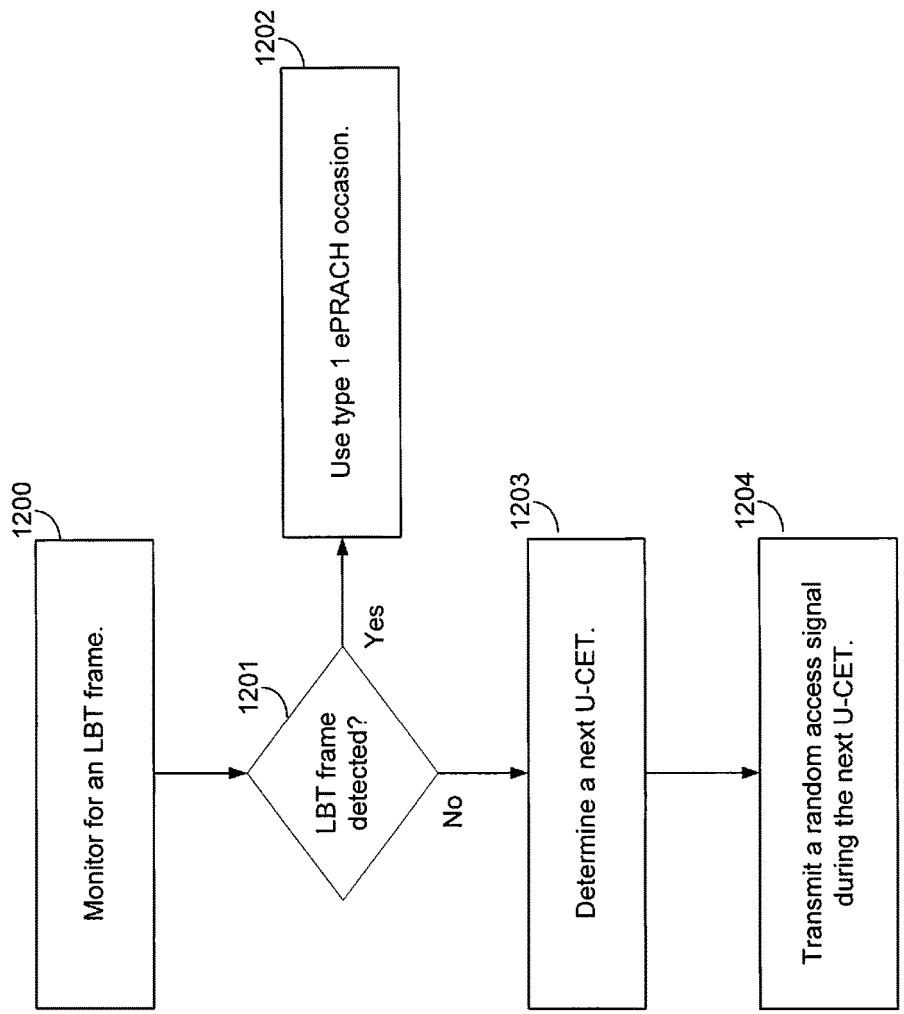

FIG. 12 is a block diagram illustrating example blocks executed to implement one aspect of the present disclosure. At block 1200, a UE, such as UE 115, will monitor for any downlink activity signals from a serving base station, such as base station 105, that indicate an LBT frame. As noted above, the type of ePRACH occasion for use is influenced by the activity of the serving base station and, thus, whether an LBT frame exists or can be detected by the UE. Accordingly, the UE will monitor for the downlink activity signals that would indicate an LBT frame.

At block 1201, a determination is made whether an LBT frame is detected. If an LBT frame is detected, then, at block 1202, the UE may use a type 1 ePRACH occasion as scheduled during the LBT frame. However, if no LBT frame is detected by the UE, the UE determines the next scheduled U-CET at block 1203. As the next U-CET occurs, the UE will transmit, at block 1204, a random access signal. Because the UE is transmitting this random access signal during U-CET, no CCA check will have to be performed by the UE prior to transmitting the random access signal.

The U-CET occasion for transmitting random access messages for ePRACH may also be referred to as a type 3 ePRACH occasion. It guarantees ePRACH transmission on the U-CET occasion for both random access and scheduling request-based ePRACH procedures. The U-CET schedule may be advertised by the base station in a system broadcast signal, such as eSIB1, and currently is configured to have an 80 ms periodicity. Because of the long periodicity of U-CET, the type 3 ePRACH procedure will often experience significant delay. Moreover, because the U-CET occasion may include transmissions from various other nodes, there may be much stronger interference than in the type 1 and type 2 ePRACH occasions. Thus, while transmission may be guaranteed during the type 3 ePRACH U-CET transmission occasion, because of the potential interference, successful reception of the ePRACH transmission cannot be guarantee. Additionally, as with other transmissions during a U-CET, the power control for this occasion may be not as reliable.

It should be noted that, in an LBT frame, an uplink subframe is generally offset ahead of the downlink subframes (e.g., N_TA_OFFSET~20 µs). Accordingly, a U-CET should not overlap with any downlink or S subframe (S subframes transitioning from downlink to uplink). A U-CET may, however, overlap with an uplink or S' subframe (S' subframes transitioning from uplink to downlink). A base station will generally continue to monitor U-CET, perhaps together with monitoring other UEs' uplink channels if it is in an LBT uplink subframe. When there is no LBT Frame, a U-CET can overlap with any subframe.

It should further be noted that the UE may skip a type 3 ePRACH occasion at the U-CET when there is no random access or scheduling request to be requested by the UE. In example operations when a virtual LBT frame is not detected, and the UE sends ePRACH in the type 3 ePRACH occasion during a U-CET, the UE may skip searching for an S' subframe for the frame.

Figure 13:
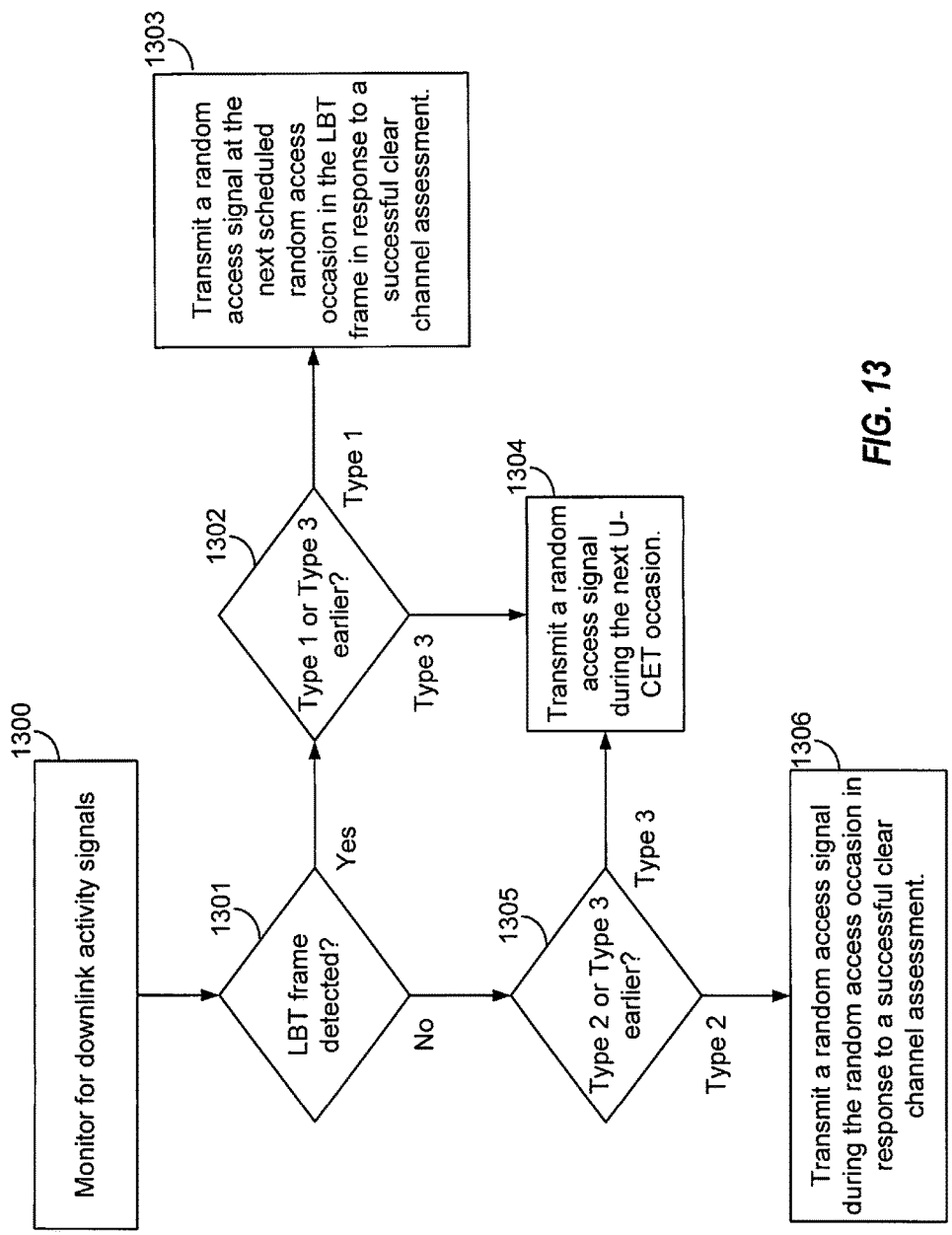

FIG. 13 is a block diagram illustrating example blocks executed to implement one aspect of the present disclosure. At block 1300, a UE, such as UE 115, monitors for downlink activity signals that would indicate an LBT frame. As noted above, the type of ePRACH occasion for use is influenced by the activity of the serving base station and, thus, whether an LBT frame exists or can be detected by the UE. Accordingly, the UE will monitor for the downlink activity signals that would indicate an LBT frame.

At block 1301, a determination is made whether an LBT frame has been detected by the UE through detection of downlink activity signals. If an LBT frame is detected, then, at block 1302, a determination is made of which of the next scheduled random access occasion (e.g., a type 1 ePRACH occasion) or the next U-CET occasion (e.g., a type 3 ePRACH occasion) is earlier. In the described aspect, the UE policy is to choose the closest ePRACH occasion. If the next scheduled random access occasion is earlier, then, at block 1303, the UE transmits a random access signal at the next scheduled random access occasion in response to detecting a clear CCA check. The UE would, upon determining that the type 1 occasion is earlier, perform a CCA check. If the CCA check is clear, then the random access signal is transmitted. If the next U-CET is the earlier occasion, then, at block 1304, the UE transmits the random access signal during the U-CET. Because the transmission occurs during the U-CET, no CCA check is necessary by the UE.

If, in response to the determination at block 1301, an LBT frame is not detected, then, at block 1305, a determination is made by the UE of which of the next random access occasion (e.g., a type 2 ePRACH occasion) or the next U-CET occasion (e.g., a type 3 ePRACH occasion) is earlier. If the next U-CET occasion is earlier, then, at block 1304, the UE transmits the random access signal during the U-CET without necessity of a CCA check. Otherwise, if the next random access occasion is earlier, then, at block 1306, the UE will transmit the random access signal during the next random access occasion in response to detecting a successful CCA. When the UE determines that the type 2 ePRACH occasion is earlier, the UE will perform a CCA check. The random access signal will be transmitted if the CCA check is detected as clear.

The type 1 ePRACH occasion scheduled in the virtual LBT frame and the type 2 ePRACH occasion that are scheduled when a virtual LBT frame is not detected are mutually exclusive. If a UE detects a virtual LBT frame, it will select from either the type 1 or type 3 ePRACH occasion, depending on which one occurs first. In the event that the type 1 and type 3 occasions collide, the UE will send ePRACH regardless of an ECCA/CCA result. If the UE does not detect a virtual LBT frame, it will select from either the type 2 or type 3 ePRACH occasion depending on which one occurs first. If the type 2 and type 3 occasions collide, the UE will, again, send ePRACH without an ECCA/CCA.

In the ePRACH procedure, the message 1 may be used for various UE statuses, such as for call setup, handover, radio link failure (RLF), uplink scheduling requests, and the like. Therefore, message 1 will generally have a variable payload size, depending on the UE status triggering the ePRACH. At the base station side, because the messages from the UE are being received in a random access process, the base station will attempt to blindly decode the received signals looking for the message 1 at a ePRACH occasion. Considering the potential variable sizes of message 1, the base station will perform blind decoding using each of the possible cyclic shifts and possible message sizes in order to properly decode message 1. This repeated blind decoding will often impact the base station processing timeline.

With a single uplink interlace assigned to ePRACH, if target coding rate is 1/3, the addition of 50 cyclic redundancy check (CRC) bits is allowed. However, when the payload size increases above that amount, edge users may experience a drop in performance because of the excessive blind decodes at the base station. Various aspects of the present disclosure provide for defining a predetermined number of fixed size payloads for message 1. When the predetermined number of fixed payload sizes is less than the total possible number of payload sizes, the number of blind decodes possible for the base station can be reduced.

Figure 14:
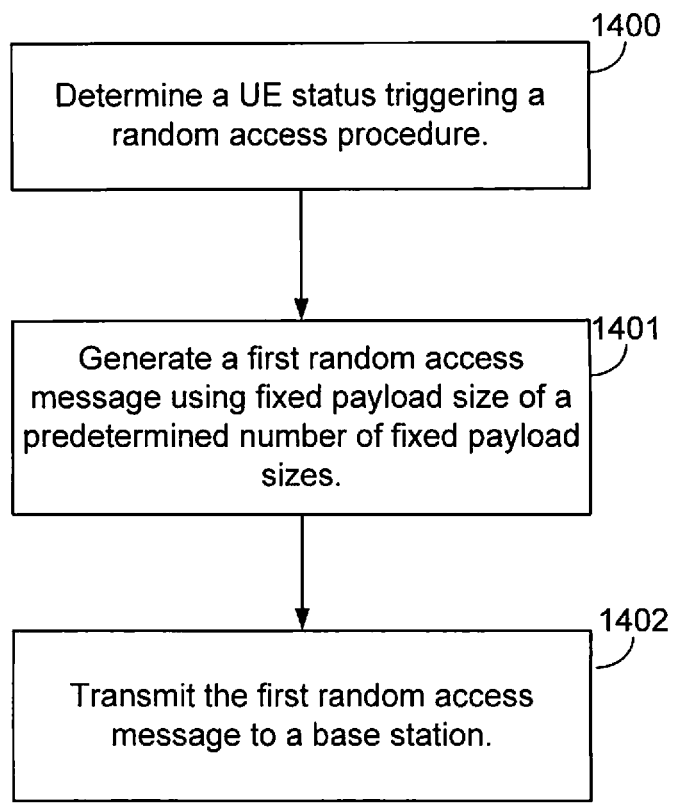

FIG. 14 is a block diagram illustrating example blocks executed to implement one aspect of the present disclosure. At block 1400, a UE, such as UE 115, determines its status that triggers a random access procedure. Various UE statuses may trigger such procedure, as noted above. For example, call setup, handover, RLF, uplink scheduling requests, and the like, would trigger a UE to begin a random access procedure.

At block 1401, the UE would generate a first random access message (e.g., a message 1) using a fixed payload size from a predetermined number of fixed payload sizes. A limited and predetermined number of fixed payload sizes are defined as available for ePRACH message 1. The UE would select one of these limited number of predetermined fixed sizes available based on the particular UE status that is triggering the ePRACH procedure. At block 1402, the UE transmits the first random access message to the base station using the selected fixed size payload.

If several message is payload size are clustered, the payload size may be fixed at largest message size of each respective cluster. For example, with the total number of message 1 payload sizes available of 3, 4, 6, and 7 bytes, various aspects of the present disclosure may define the predetermined number of payload sizes at 4 and 7 bytes. Thus, regardless of actual contents depending on the particular UE status triggering the ePRACH, the payload size of the first message will be one of the two predetermined fixed sizes. If the actual payload size is smaller than the fixed size selected, zero-padding will be added to fill the remaining available payload. For example, in the aspect in which two predetermined payload sizes of 4 and 7 bytes is defined, a message size of 3 bytes will be zero padded to the fixed 4 byte size message, while a message size of 6 bytes will be zero padded to the fixed 7 byte size. As long as the target coding rate remains at an acceptable level, providing the predetermined number of fixed payload sizes may reduce payload size related to the blind decoding at the base station side due to the UE status. According to the examples provided above, the target coding rate would be 72/200=0.36, which would be deemed acceptable.

Figure 15:
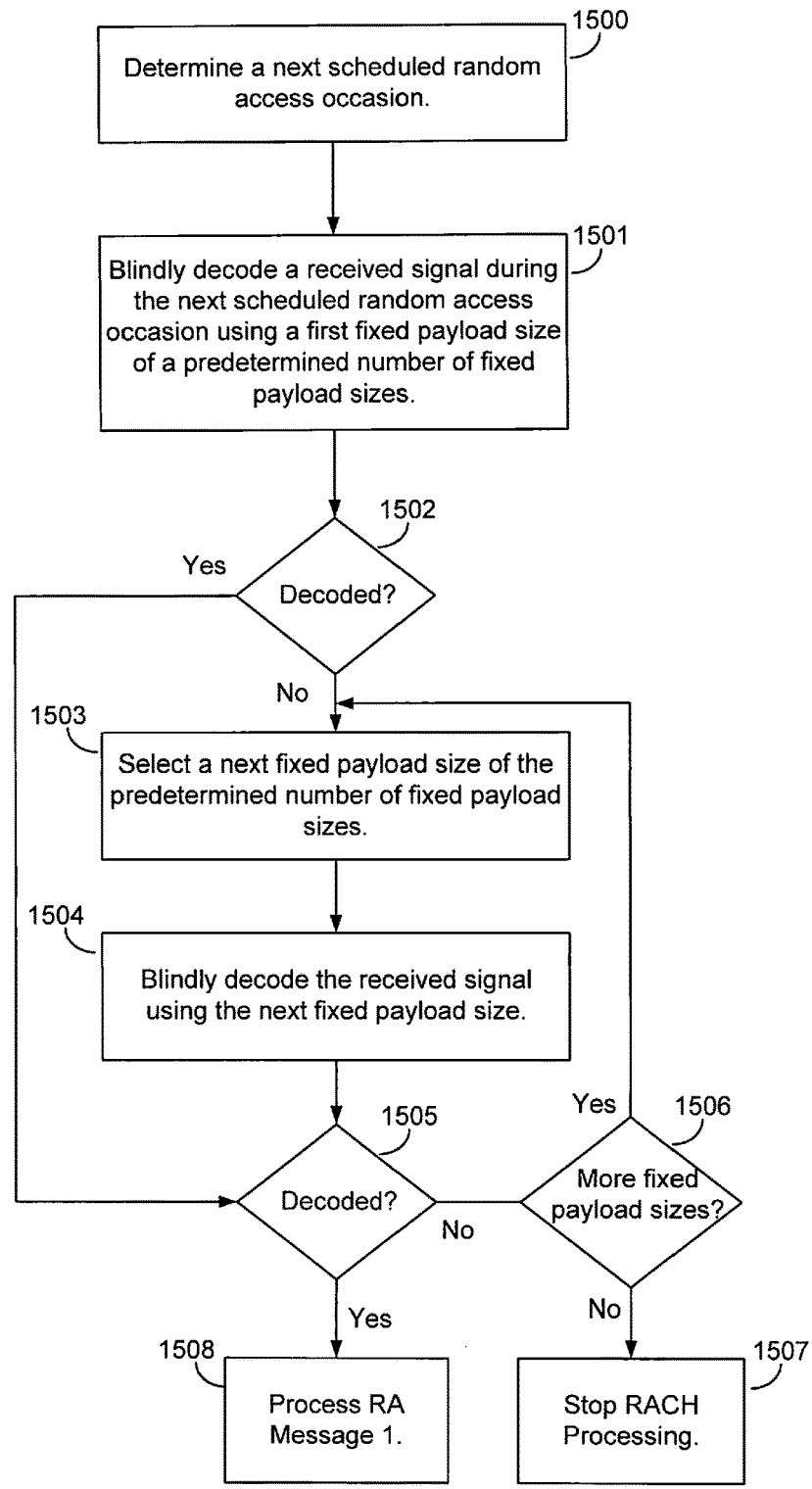

FIG. 15 is a block diagram illustrating example blocks executed to illustrate one aspect of the present disclosure. At block 1500, a base station, such as base station 105, determines a next scheduled random access occasion. The base station will continue to look at received signals during the scheduled ePRACH occasions. Thus, at block 1501, the base station blindly decodes a received signal during the next scheduled random access occasion using a first fixed payload size of a predetermined number of fixed payload sizes. This predetermined number is less than the total number of payload sizes that are possible for an ePRACH message 1.

At block 1502, a determination is made whether the received signal was properly decoded using the first selected fixed payload size. If so, then, at block 1507, the base station will process the random access message 1. Otherwise, if the received signal was not properly decoded using the first selected fixed payload size, then, at block 1503, the base station selects the next fixed payload size of the predetermined set. At block 1504, the base station attempts to decode the received signal using the next selected fixed payload size. At block 1505, a determination is made whether the base station was able to properly decode the received signal using the next selected fixed payload size. If the base station can properly decode the received signal into a random access signal using the selected next fixed payload size, then, at block 1508, the base station will process the random access message.

Otherwise, if the base station cannot properly decode the received signal, then, at block 1506, the base station determines if there are any additional fixed payload sizes in the predetermined number of payload sizes and repeats the selection of a next fixed size and decoding attempt at blocks 1503 and 1504, respectively. Otherwise, if there are no more fixed payload sizes available for the base station, the base station will stop RACH processing at block 1507.

In various additional aspects of the present disclosure, there may be an occasion where the actual payload size of the random access message is too large to fit into a single uplink interlace. In such circumstances, the ePRACH procedure may still define a predetermined set of fixed payload sizes, but also allow the UE to select more than one interlace onto which the random access message may be transmitted. For example, with a fixed payload size of 4 bytes, the UE may select to split the random access message with a total payload of 7 bits into two uplink interlaces, each configured with the fixed 4 byte payload size, the UE may place up to 3 bytes of the message payload into one interlace and 4 bytes of the message payload into the other interlace. Zero-padding may be used to fill any remaining available size of the message.

Use of multiple interlaces may provide more favorable results in satisfying the power spectral density (PSD) requirements and maximum power limitations, than transmitting a larger payload size in a single interlace. Additionally, when splitting the random access message across multiple interlaces, the UE will add fragmentation information to the message so that the base station may reassemble the transmissions back into the single random access message.

The procedure defined for ePRACH is different than for PRACH. For example, there is no preamble involved in ePRACH, as there is with PRACH. However, because of the ePRACH uplink interlace, cyclic shift, different ePRACH occasions, and potentially larger RAR window size, due to ECCA/CCA procedure, it may be beneficial to redefine RA-RNTI. In a first example aspect, the RA-RNTI may be determined a function of $f_{id}$ and $t_{id}$, but not a function of the number of cyclic shifts, $N_{CS}$. For example, the RA-RNTI may be defined according to the following equation:

$$\text{RA-RNTI}=1+t_{id}+10*f_{id} \qquad (4)$$

wherein, $t_{id}$ represents the subframe number (e.g., typically in a range between 0 and 9), and $f_{id}$ represents the ePRACH uplink interlace index (e.g., typically, for TDD implementations, in a range between 0 and 5).

FIG. 16 is a block diagram illustrating example blocks executed to implement one aspect of the present disclosure. At block 1600, a base station, such as base station 105, determines a random access temporary identifier (e.g., RA-RNTI) based on a time-frequency resource used to receive a random access signal from one or more UEs, such as UE 115. The random access temporary identifier is determined by the base station within the context of the random access procedure using the time-frequency resource (e.g., $t_{id}$ and $f_{id}$) that the specific UE used to transmit the random access message 1.

At block 1601, the base station generates a random access response that includes an uplink grant for each of the UEs. The random access response will be coded using the random access temporary identifier. At block 1602, the base station will transmit the random access response with the uplink grants either in a single downlink shared channel, in which multiple uplink grants to the different UEs will be included in the single downlink shared channel, or in multiple individual downlink shared channels, in which a separate downlink shared channel will be transmitted to each UE with the corresponding uplink grant to that particular UE. As noted, the downlink shared channels will be addressed based, at least in part, on the random access temporary identifier.

In one example aspect of the present disclosure, a single PDSCH may carry multiple uplink grants corresponding to different cyclic shifts of the same resource block. With the single PDSCH carrying uplink grants for different UEs, the PDSCH will include a mapping from $N_{CS}$ to the specific uplink grant, similar to the preamble in PRACH allowing a mapping to the uplink grants. In operation with a typical network configuration, there are at most 12 $N_{CS}$ per resource block. As such, a 4-bit mapping would sufficient, in which two bits are allocated to the RAR response SFN for an ePRACH to allow a maximum RAR window of 40 ms. This configuration is similar to the current PRACH handling of the PRACH message 2 from the base station.

In an alternative aspect of the present disclosure, as noted at block 1602, a base station may generate multiple PDSCH, each carrying a single uplink grant for the specific UE. While this alternative aspect alleviates the need to provide mapping from $N_{CS}$ to the specific uplink grant, the multiplicity of PDSCH generation and transmission will cost considerable base station resources.

In a further alternative aspect of the present disclosure, RA-RNTI may be defined as a function of $f_{id}$, and $t_{id}$, but not as a function of $N_{CS}$. A UE would select $N_{CS}$ from the pool of available in order to transmit the ePRACH signal. The base station would perform blind searches for ePRACH using all possible $N_{CS}$ values. Once the base station properly decodes the ePRACH, it would include the $N_{CS}$ used for proper decoding in a MAC control element and uses the RA-RNTI implied from the time-frequency resource of the received ePRACH to transmit the RAR. Such alternative aspect may further define the RA-RNTI according to the RAR window size, consistent with the following equation:

$$\text{RA-RNTI}=1+t_{id}+\text{RARWindowSize}*f_{id} \quad (5)$$

where, $t_{id}$ represents the accumulated subframe number within the RAR window typically ranging between 0 and the RAR window size −1, $f_{id}$ represents the ePRACH uplink interlace index typically ranging between 0 and 5. In one example operation, the RAR window size may be set to 40 ms. In such example operation, equation (5) becomes:

$$\text{RA-RNTI}=1+t_{id}+40*f_{id} \quad (5a)$$

where $t_{id}$ ranges between 0 and 39. The UE keeps monitoring the RA-RNTI on which it sent the ePRACH. If the RAR is detected on the same RA-RNTI, the UE knows that the base station received the ePRACH.

In a further alternative aspect, the RA-RNTI may be defined as a function of $f_{id}$, $t_{id}$, and $N_{CS}$, in which no MAC control element would be needed to convey $N_{CS}$. According to this alternative aspect, the equation for RA-RNTI from equation (5) becomes:

$$\text{RA-RNTI}=1+t_{id}+\text{RARWindowSize}*(N_{CS}+N_{CS}\text{Range}*f_{id}) \quad (6)$$

Because each of $f_{id}$, $t_{id}$, and $N_{CS}$ are used in defining RA-RNTI, there will be a one-to-one mapping between the resource used by the UE for ePRACH message 1 and the corresponding RA-RNTI used in coding message 2 from the base station. With the addition of $N_{CS}$ in defining RA-RNTI, RA-RNTI will include an increased set of potential values, but with the benefit of a more flexible conflict resolution management. In one example operation of the presently described aspect, the RAR window is 10 ms and there are 12 cyclic shifts, $N_{CS}$=12. In this example operation, equation (6) for the RA-RNTI becomes:

$$\text{RA-RNTI}=1+t_{id}+10(N_{CS}+12*f_{id}) \quad (6a)$$

where $t_{id}$ ranges between 0 and 9, $N_{CS}$ ranges between 0 and 11, and $f_{id}$ ranges between 0 and 5.

The ePRACH procedures are configured for operation within a communication network that includes contention-based shared frequency spectrum. This frequency spectrum may be shared with WiFi networks and devices. Thus, WiFi devices could experience increased delay and reduced performance when required to blindly sense and back-off the shared channels when collisions are detected with transmissions resulting from the various aspects of the present disclosure. However, additional aspects of the present disclosure are configured to provide transmission duration information to neighboring WiFi devices in order to allow such WiFi devices to intelligently schedule WiFi communications.

FIG. 17 is a block diagram illustrating example blocks executed to implement one aspect of the present disclosure. At block 1700, a UE, such as UE 115, detects a successful CCA check prior to sending a random access signal during either a scheduled random access occasion in a first uplink subframe of a detected LBT frame or a random access occasion occurring when an LBT frame is not detected. At block 1701, the UE generates a wideband channel reserving signal that includes a duration indicator indicating an estimated duration of the random access signal of one uplink subframe.

As indicated, the duration identifier for a type 1 ePRACH occasion scheduled during an LBT frame is based on one uplink subframe, when the type 1 ePRACH occasion is present in the first uplink subframe of the LBT frame. Because the ePRACH procedure is triggered for call setup, handover, RLF, and the like, there should be no other downlink or uplink grants. As such, there should also be no corresponding ePUCCH/ePUSCH. The duration for a type 2 ePRACH occasion without detection of an LBT frame will be based on one uplink subframe regardless of the particular subframe in which the ePRACH occasion is located.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 7, 9, and 12-17 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
monitoring for downlink activity signals;
determining a random access occasion in response to not detecting the downlink activity signals, wherein the random access occasion occurs at a subframe n, the downlink activity signals are not detected between the subframes n−M and n−N, wherein M satisfies the relationship of $(N+1) \leq M \leq$ (listen before talk (LBT) frame length+N), where N is a minimum number of subframes for not detecting the downlink activity signals before the random access occasion;
detecting a successful clear channel assessment (CCA) prior to the random access occasion, wherein the successful CCA is detected on or before a random access resynchronization boundary for the subframe n; and
transmitting a random access signal at the random access occasion in response to the successful clear channel assessment.

2. The method of claim 1, wherein the random access resynchronization boundary occurs between a subframe n−1 and a guaranteed channel reserving signal boundary, wherein the guaranteed channel reserving signal boundary includes a minimum duration of one or more channel reserving signals transmitted before uplink transmission on a next uplink subframe.

3. The method of claim 1, further including:
transmitting the random access signal at a subsequent a subframe n+1 within the configured window in response to a failure to detect the successful CCA at a subframe n−1.

4. The method of claim 1, further including:
transmitting the random access signal at a subsequent random access occasion after the random access occasion in response to detecting downlink activity signals at a subframe n−2.

5. A method of wireless communication, comprising:
monitoring for downlink activity signals, wherein the monitoring for downlink activity signals is performed between the subframes n−M and n−3, wherein M satisfies the relationship $4 \leq M \leq 10$;

determining a random access occasion in response to not detecting the downlink activity signals, wherein the random access occasion occurs at a subframe n;

detecting a successful clear channel assessment (CCA) prior to the random access occasion, wherein the successful CCA is detected on or before a random access resynchronization boundary for the subframe n, wherein the random access resynchronization boundary occurs between a subframe n−2 and a guaranteed channel reserving signal boundary, wherein the guaranteed channel reserving signal boundary includes a minimum duration of one or more channel reserving signals transmitted before uplink transmission on a next uplink subframe; and transmitting a random access signal at the random access occasion in response to the successful clear channel assessment.

6. The method of claim 5, wherein the downlink activity signals include one or more of:
a frame format indicator; and
a downlink channel reserving signal.

7. An apparatus configured for wireless communication, comprising:
means for monitoring for downlink activity signals;
means for determining a random access occasion in response to not detecting the downlink activity signals, wherein the random access occasion occurs at a subframe n, the downlink activity signals are not detected between the subframes n−M and n−N, wherein M satisfies the relationship of (N+1)≤M≤(listen before talk (LBT) frame length+N), where N is a minimum number of subframes for not detecting the downlink activity signals before the random access occasion;
means for detecting a successful clear channel assessment (CCA) prior to the random access occasion, wherein the successful CCA is detected on or before a random access resynchronization boundary for the subframe n; and
means for transmitting a random access signal at the random access occasion in response to the successful clear channel assessment.

8. The apparatus of claim 7, further including:
means for transmitting the random access signal at a subsequent subframe n+1 within the configured window in response to a failure to detect the successful CCA at a subframe n−1.

9. The apparatus of claim 7, wherein the random access resynchronization boundary occurs between a subframe n−1 and a guaranteed channel reserving signal boundary, wherein the guaranteed channel reserving signal boundary includes a minimum duration of one or more channel reserving signals transmitted before uplink transmission on a next uplink subframe.

10. The apparatus of claim 7, further including:
means for transmitting the random access signal at a subsequent random access occasion after the random access occasion in response to detecting downlink activity signals at a subframe n−2.

11. A non-transitory computer-readable medium having program code recorded thereon, comprising:
program code for causing a computer to monitor for downlink activity signals;
program code for causing the computer to determine a random access occasion in response to not detecting downlink activity signals, wherein the random access occasion occurs at a subframe n, the downlink activity signals are not detected between the subframes n−M and n−N, wherein M satisfies the relationship of (N+1)≤M≤(listen before talk (LBT) frame length+N), where N is a minimum number of subframes for not detecting the downlink activity signals before the random access occasion;
program code for causing the computer to detect a successful clear channel assessment (CCA) prior to the random access occasion, wherein the successful CCA is detected on or before a random access resynchronization boundary for the subframe n; and
program code for causing the computer to transmit a random access signal at the random access occasion in response to the successful clear channel assessment.

12. The non-transitory computer-readable medium of claim 11, wherein the random access resynchronization boundary occurs between a subframe n−1 and a guaranteed channel reserving signal boundary, wherein the guaranteed channel reserving signal boundary includes a minimum duration of one or more channel reserving signals transmitted before uplink transmission on a next uplink subframe.

13. The non-transitory computer-readable medium of claim 11, further including:
program code for causing the computer to transmit the random access signal at a subsequent subframe n+1 within the configured window in response to a failure to detect the successful CCA at a subframe n−1.

14. The non-transitory computer-readable medium of claim 11, further including:
program code for causing the computer to transmit the random access signal at a subsequent random access occasion after the random access occasion in response to detecting downlink activity signals at a subframe n−2.

15. An apparatus configured for wireless communication, the apparatus comprising:
at least one processor; and
a memory coupled to the at least one processor,
wherein the at least one processor is configured:
to monitor for downlink activity signals;
to determine a random access occasion in response to not detecting downlink activity signals, wherein the random access occasion occurs at a subframe n, the downlink activity signals are not detected between the subframes n−M and n−N, wherein M satisfies the relationship of (N+1)≤M≤(listen before talk (LBT) frame length+N), where N is a minimum number of subframes for not detecting the downlink activity signals before the random access occasion;
to detect a successful clear channel assessment (CCA) prior to the random access occasion, wherein the successful CCA is detected on or before a random access resynchronization boundary for the subframe n; and
to transmit a random access signal at the random access occasion in response to the successful clear channel assessment.

16. The apparatus of claim 15, wherein the random access resynchronization boundary occurs between a subframe n−1 and a guaranteed channel reserving signal boundary, wherein the guaranteed channel reserving signal boundary includes a minimum duration of one or more channel reserving signals transmitted before uplink transmission on a next uplink subframe.

17. The apparatus of claim 15, further including configuration of the at least one processor to transmit the random access signal at a subsequent subframe n+1 within the configured window in response to a failure to detect the successful CCA at a subframe n−1.

18. The apparatus of claim 15, further including configuration of the at least one processor to transmit the random access signal at a subsequent random access occasion after the random access occasion in response to detecting downlink activity signals at a subframe n−2.

19. An apparatus configured for wireless communication, comprising:
 means for monitoring for downlink activity signals, wherein the means for monitoring for downlink activity signals is executed between the subframes n−M and n−3, wherein M satisfies the relationship 4≤M≤10;
 means for determining a random access occasion in response to not detecting the downlink activity signals, wherein the random access occasion occurs at a subframe n;
 means for detecting a successful clear channel assessment (CCA) prior to the random access occasion, wherein the successful CCA is detected on or before a random access resynchronization boundary for the subframe n, wherein the random access resynchronization boundary occurs between a subframe n−2 and a guaranteed channel reserving signal boundary, wherein the guaranteed channel reserving signal boundary includes a minimum duration of one or more channel reserving signals transmitted before uplink transmission on a next uplink subframe; and
 means for transmitting a random access signal at the random access occasion in response to the successful clear channel assessment.

20. The apparatus of claim 19, wherein the downlink activity signals include one or more of:
 a frame format indicator; and
 a downlink channel reserving signal.

21. A non-transitory computer-readable medium having program code recorded thereon, comprising:
 program code for causing a computer to monitor for downlink activity signals, wherein the program code for causing the computer to monitor for downlink activity signals is executed between the subframes n−M and n−3, wherein M satisfies the relationship 4≤M≤10;
 program code for causing the computer to determine a random access occasion in response to not detecting downlink activity signals, wherein the random access occasion occurs at a subframe n;
 program code for causing the computer to detect a successful clear channel assessment (CCA) prior to the random access occasion, wherein the successful CCA is detected on or before a random access resynchronization boundary for the subframe n, wherein the random access resynchronization boundary occurs between a subframe n−2 and a guaranteed channel reserving signal boundary, wherein the guaranteed channel reserving signal boundary includes a minimum duration of one or more channel reserving signals transmitted before uplink transmission on a next uplink subframe; and
 program code for causing the computer to transmit a random access signal at the random access occasion in response to the successful clear channel assessment.

22. The non-transitory computer-readable medium of claim 21, wherein the downlink activity signals include one or more of:
 a frame format indicator; and
 a downlink channel reserving signal.

23. An apparatus configured for wireless communication, the apparatus comprising:
 at least one processor; and
 a memory coupled to the at least one processor,
 wherein the at least one processor is configured:
  to monitor for downlink activity signals, wherein the configuration of the at least one processor to monitor for downlink activity signals is executed between the subframes n−M and n−3, wherein M satisfies the relationship 4≤M≤10;
  to determine a random access occasion in response to not detecting downlink activity signals, wherein the random access occasion occurs at a subframe n;
  to detect a successful clear channel assessment (CCA) prior to the random access occasion, wherein the successful CCA is detected on or before a random access resynchronization boundary for the subframe n, wherein the random access resynchronization boundary occurs between a subframe n−2 and a guaranteed channel reserving signal boundary, wherein the guaranteed channel reserving signal boundary includes a minimum duration of one or more channel reserving signals transmitted before uplink transmission on a next uplink subframe; and
  to transmit a random access signal at the random access occasion in response to the successful clear channel assessment.

24. The apparatus of claim 23, wherein the downlink activity signals include one or more of:
 a frame format indicator; and
 a downlink channel reserving signal.

* * * * *